United States Patent
Ikeda et al.

(10) Patent No.: US 9,878,956 B2
(45) Date of Patent: Jan. 30, 2018

(54) POLYCRYSTALLINE DIAMOND AND MANUFACTURING METHOD THEREOF, SCRIBE TOOL, SCRIBING WHEEL, DRESSER, ROTATING TOOL, ORIFICE FOR WATER JET, WIREDRAWING DIE, CUTTING TOOL, AND ELECTRON EMISSION SOURCE

(71) Applicant: Sumitomo Electric Industries, Ltd., Osaki-shi (JP)

(72) Inventors: Kazuhiro Ikeda, Itami (JP); Keiko Arimoto, Itami (JP); Katsuko Yamamoto, Itami (JP); Hitoshi Sumiya, Itami (JP); Takeshi Sato, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/167,315

(22) Filed: May 27, 2016

(65) Prior Publication Data

US 2016/0272546 A1    Sep. 22, 2016

Related U.S. Application Data

(62) Division of application No. 14/235,763, filed as application No. PCT/JP2012/068932 on Jul. 26, 2012, now Pat. No. 9,714,197.

(30) Foreign Application Priority Data

Jul. 28, 2011  (JP) ................. 2011-165747
Jul. 28, 2011  (JP) ................. 2011-165748
Jul. 28, 2011  (JP) ................. 2011-165749

(51) Int. Cl.
B24D 3/02    (2006.01)
B24D 3/00    (2006.01)
(Continued)

(52) U.S. Cl.
CPC ............ *C04B 35/52* (2013.01); *B01J 3/062* (2013.01); *C01B 32/25* (2017.08);
(Continued)

(58) Field of Classification Search
USPC .......................................... 51/307, 293, 309
See application file for complete search history.

(56) References Cited

U.S. PATENT DOCUMENTS

2006/0144702 A1* 7/2006 Seki .................... C02F 1/46109
                                                      204/280
2012/0094117 A1* 4/2012 Kawano ................ C01B 31/06
                                                      428/341

FOREIGN PATENT DOCUMENTS

CN      1735716 A      2/2006
JP      10-045473 A    2/1998
(Continued)

OTHER PUBLICATIONS

Ekimov et al., "Superconductivity in diamond," Nature, vol. 428 (2004), pp. 542-545.
(Continued)

*Primary Examiner* — James McDonough
(74) *Attorney, Agent, or Firm* — Venable LLP; Michael A. Sartori; Miguel A. Lopez

(57) ABSTRACT

Nano polycrystalline diamond is composed of carbon, an element of different type which is an element other than carbon and is added to be dispersed in carbon at an atomic level, and an inevitable impurity. The polycrystalline diamond has a crystal grain size not greater than 500 nm. The polycrystalline diamond can be fabricated by subjecting graphite in which the element of different type which is an element other than carbon has been added to be dispersed in carbon at an atomic level to heat treatment within high-pressure press equipment.

3 Claims, 4 Drawing Sheets

(51) Int. Cl.
*B24D 11/00* (2006.01)
*B24D 18/00* (2006.01)
*C09K 3/14* (2006.01)
*C04B 35/52* (2006.01)
*B01J 3/06* (2006.01)
*C01B 32/25* (2017.01)

(52) U.S. Cl.
CPC .. *B01J 2203/061* (2013.01); *B01J 2203/0655* (2013.01); *C04B 2235/42* (2013.01); *C04B 2235/427* (2013.01); *Y10T 428/2982* (2015.01)

(56) References Cited

FOREIGN PATENT DOCUMENTS

| | | |
|---|---|---|
| JP | 2003-292397 A | 10/2003 |
| JP | 2006-045026 A | 2/2006 |
| JP | 2009-067609 A | 4/2009 |
| JP | 2010-045184 A | 2/2010 |
| JP | 2010-222165 A | 10/2010 |
| WO | WO-96/33507 A1 | 10/1996 |
| WO | WO-2004/104272 A1 | 12/2004 |

OTHER PUBLICATIONS

International Search Report in PCT International Application No. PCT/JP2012/068932, dated Oct. 30, 2012.
Notification of the First Office Action in Chinese Patent Application No. 2012800379430, dated Feb. 13, 2015.
Extended European Search Report in European Patent Application No. 12818264.9, dated Oct. 19, 2015.

* cited by examiner

POLYCRYSTALLINE DIAMOND AND MANUFACTURING METHOD THEREOF, SCRIBE TOOL, SCRIBING WHEEL, DRESSER, ROTATING TOOL, ORIFICE FOR WATER JET, WIREDRAWING DIE, CUTTING TOOL, AND ELECTRON EMISSION SOURCE

CROSS-REFERENCE TO RELATED APPLICATIONS

This application is a Divisional of U.S. patent application Ser. No. 14/235,763, filed Jan. 28, 2014, which is a 371 application of International Application No. PCT/JP2012/068932, filed Jul. 26, 2012, which claims the benefit of Japanese Patent Application Nos. 2011-165747, 2011-165748 and 2011-165749, filed Jul. 28, 2011.

TECHNICAL FIELD

The present invention relates to polycrystalline diamond and a manufacturing method thereof, a scribe tool, a scribing wheel, a dresser, a rotating tool, an orifice for water jet, a wiredrawing die, a cutting tool, and an electron emission source, and particularly to diamond having crystal grains of a nano size, to which an element other than carbon has uniformly been added (hereinafter referred to as "different-type-element-added nano polycrystalline diamond"), group-III-element-added nano polycrystalline diamond, group-V-element-added nano polycrystalline diamond, and a method of manufacturing the former, as well as various tools and an electron emission source containing the polycrystalline diamond.

BACKGROUND ART

It has recently been clarified that a nano polycrystalline diamond sintered object has hardness exceeding natural single-crystal diamond and has a property excellent as a tool. Though the nano polycrystalline diamond is essentially an insulator, a further function such as conductivity can be provided to diamond by adding other elements such as an appropriate dopant. In addition, by appropriately selecting an element to be added to diamond, various characteristics of diamond such as optical characteristics, electrical characteristics, and mechanical characteristics can be varied.

For example, a method of adding a dopant to graphite by forming a solid solution thereof is available as a method of adding a dopant capable of providing conductivity to diamond, as shown in E. A. Ekimov et al., Nature, Vol. 428 (2004), 542 to 545.

Though the nano polycrystalline diamond is essentially an insulator as described above, conductivity can be provided to diamond by adding an element serving as an acceptor to diamond. The document above describes a method of synthesizing diamond to which boron has been added.

In addition, conductivity can be provided to diamond by adding an element serving as a donor to diamond. For example, Japanese Patent Laying-Open No. 2010-222165 describes a diamond layer containing an element capable of providing conductivity. Though electrons can be emitted from n-type diamond in particular, it has been impossible to obtain n-type diamond doped with a donor at a high concentration through high-temperature and high-pressure synthesis. In order to solve this problem, an example where doping with phosphorus is carried out with vapor phase synthesis (CVD) has been reported. With this method, however, it is extremely difficult to achieve doping at a high concentration or to introduce a dopant other than phosphorus.

CITATION LIST

Patent Document

PTD 1: Japanese Patent Laying-Open No. 2010-222165

Non Patent Document

NPD 1: E. A. Ekimov et al., Nature, Vol. 428 (2004), 542 to 545

SUMMARY OF INVENTION

Technical Problem

As described above, however, with the method of adding a dopant to graphite by forming a solid solution thereof, it is difficult to disperse a dopant in graphite at the atomic level. Therefore, a dopant will unevenly distribute in graphite. When graphite in which a dopant thus unevenly distributes is directly converted to diamond, crystal grains of diamond will become large locally in a portion where a dopant concentration is high. Consequently, a crystal grain size of diamond will vary approximately from several ten nm to several hundred μm. Therefore, it becomes difficult to obtain doped nano polycrystalline diamond having crystal grains all in the same nano size. In addition, when graphite in which a solid solution with a dopant is formed is directly converted to diamond, a dopant cluster is also produced.

In forming a solid solution of graphite with a dopant, generally, an individual element serving as a dopant or such a compound as oxide, hydride, or halide of an element serving as a dopant is employed. When such a substance is employed, however, hydride, oxide, or the like of a dopant will also remain or produce a compound. Owing to a catalytic action thereof, crystal grains of resultant diamond may locally become abnormally large.

A next possible method is a method of pulverizing graphite powders and dopant powders as finely as possible, carrying out strict screening, then mixing these powders, subjecting the powders further to heating reaction treatment, and employing the resultant powders as a source material.

With this method, however, it is difficult to mix graphite and a dopant at the atomic level, and most of dopant atoms form clusters of at least two or more atoms aggregated. Therefore, concentration distribution of a dopant in graphite is likely, and crystal grains of diamond made of graphite also tend to partially grow fast. Therefore, in a case of this technique as well, it is difficult to obtain a doped nano polycrystalline diamond sintered object having crystal grains having the same nano size.

The problem described above also similarly arises in the case that an element other than a dopant is added to diamond.

With the method described in NPD 1 above, graphite and $B_4C$ are caused to react with each other so as to form a solid solution of graphite with boron. In the case of this method as well, however, it is difficult to disperse boron in graphite at the atomic level. Therefore, when graphite in which a solid solution with boron is formed is directly converted to diamond, dopant clusters or the like will again be produced. In addition, in forming a solid solution of graphite with boron, hydride, oxide, or the like of boron is produced.

Owing to a catalytic action thereof, a crystal grain size of resultant diamond may locally become abnormally large. Consequently, it becomes difficult to fabricate boron-added nano polycrystalline diamond having the same crystal grain size.

Then, a next possible method is exemplified by a method of pulverizing graphite powders and powders of such an acceptor element as boron as finely as possible, carrying out strict screening, then mixing these powders or subjecting the powders further to heating reaction treatment, and employing the resultant powders as a source material, as in the case described above.

With this method again, however, it is difficult for acceptor atoms alone to mix with graphite powders, and most of the acceptor atoms form clusters in which at least two or more atoms are adjacent to each other. Therefore, concentration distribution of the acceptor element in diamond is likely. Consequently, crystal grains of diamond tend to partially grow fast, and it has been difficult to obtain nano polycrystalline diamond having crystal grains of a uniform nano size.

On the other hand, n-type conductivity can be provided to diamond by adding an element serving as a donor to diamond. Diamond having n-type conductivity has electron emission characteristics as described above. By making use of these characteristics, diamond having n-type conductivity can be used, for example, for an electron gun.

Single crystal synthesis or vapor phase synthesis has been known as a technique for fabricating diamond having conductivity. Whichever technique of single crystal synthesis and vapor phase synthesis may be employed, however, it is very difficult to fabricate nano polycrystalline diamond having a donor element uniformly added thereto and having n-type conductivity.

For example, with a technique of directly converting graphite to diamond, it has been considered that diamond can be doped with a donor because donor atoms can be confined in diamond. Actually, however, it is extremely difficult to form a uniform solid solution of graphite, which is a source material, with donor atoms.

A method of adding donor atoms to diamond in a most simplified manner is exemplified by a method of pulverizing graphite powders and powders of a donor element as finely as possible, carrying out strict screening, then mixing these powders or subjecting the powders further to heating reaction treatment, and employing the resultant powders as a source material. With this method, however, it is difficult for donor atoms alone to mix with graphite powders, and most of the donor atoms form clusters in which at least two or more atoms are adjacent to each other. Therefore, concentration distribution of the donor element in diamond is likely. Consequently, crystal grains of diamond tend to partially grow fast, and it has been difficult to obtain nano polycrystalline diamond having crystal grains of a uniform nano size.

The present invention was made in view of the problems as described above, and one object of the present invention is to provide nano polycrystalline diamond obtained by uniformly adding an element other than carbon to diamond and a manufacturing method thereof.

Another object of the present invention is to provide nano polycrystalline diamond obtained by uniformly adding an acceptor element to diamond at an unprecedented level and a manufacturing method thereof, a scribe tool, a scribing wheel, a dresser, a rotating tool, an orifice for water jet, a wiredrawing die, and a cutting tool including the polycrystalline diamond.

Yet another object of the present invention is to provide nano polycrystalline diamond obtained by uniformly adding a donor element to diamond and a manufacturing method thereof and an electron emission source made of the polycrystalline diamond.

Solution to Problem

Polycrystalline diamond according to the present invention is composed of carbon, an element of different type which is an element other than carbon and is added to be dispersed in carbon at the atomic level, and an inevitable impurity. The polycrystalline diamond has a crystal grain size approximately not greater than 500 nm.

The element of different type is preferably dispersed in carbon as a substitutional isolated atom. A concentration of the element of different type is, for example, approximately not lower than $1 \times 10^{14}/cm^3$ and not higher than $1 \times 10^{22}/cm^3$. The polycrystalline diamond can be fabricated by sintering graphite obtained by thermally decomposing a gas mixture of a gas containing the element of different type and a hydrocarbon gas at a temperature not lower than 1500° C.

A method for manufacturing polycrystalline diamond according to the present invention includes the steps of preparing graphite that an element of different type which is an element other than carbon is added to be dispersed in carbon at the atomic level and directly converting this graphite to diamond by subjecting graphite to heat treatment within high-pressure press equipment.

In the step of converting graphite to diamond, preferably, graphite is heated within the high-pressure press equipment without adding a sintering aid or a catalyst. The step of preparing graphite may include the step of forming graphite to which the element of different type has been added on a base material by introducing a gas mixture of a gas containing the element of different type and a hydrocarbon gas within a vacuum chamber and thermally decomposing the gas mixture at a temperature not lower than 1500° C. In the step of converting graphite to diamond, graphite formed on the base material may be heated within the high-pressure press equipment. The gas mixture is preferably fed toward a surface of the base material. For example, a methane gas can be used as the hydrocarbon gas.

Polycrystalline diamond according to another aspect of the present invention is composed of carbon, a group III element added to be dispersed in carbon at the atomic level, and an inevitable impurity. The polycrystalline diamond has a crystal grain size (a maximum length of a crystal grain) approximately not greater than 500 nm.

The group III element is preferably dispersed in carbon as a substitutional isolated atom. A concentration of the group III element is, for example, approximately not lower than $1 \times 10^{14}/cm^3$ and not higher than $1 \times 10^{22}/cm^3$. The polycrystalline diamond can be fabricated by sintering graphite obtained by thermally decomposing a gas mixture of a gas containing the group III element and a hydrocarbon gas at a temperature not lower than 1500° C.

A method for manufacturing polycrystalline diamond according to another aspect of the present invention includes the steps of preparing graphite that a group III element is added to be dispersed in carbon at the atomic level and converting this graphite to diamond by subjecting graphite to heat treatment within high-pressure press equipment.

In the step of converting graphite to diamond, preferably, graphite is subjected to heat treatment within the high-pressure press equipment without adding a sintering aid or a catalyst. The step of preparing graphite may include the step of forming graphite on a base material by introducing a gas mixture of a gas containing the group III element and a hydrocarbon gas within a vacuum chamber and thermally decomposing the gas mixture at a temperature not lower than 1500° C. In the step of converting graphite to diamond, graphite formed on the base material may be subjected to heat treatment at a high pressure not lower than 8 GPa and at 1500° C. or higher. The gas mixture is preferably fed toward a surface of the base material. For example, a methane gas can be used as the hydrocarbon gas.

The polycrystalline diamond can be used in various tools, Specifically, the polycrystalline diamond can be used for a scribe tool, a scribing wheel, a dresser, a rotating tool, an orifice for water jet, a wiredrawing die, and a cutting tool.

Polycrystalline diamond according to yet another aspect of the present invention is composed of carbon, a group V element added to be dispersed in carbon at the atomic level, and an inevitable impurity. The polycrystalline diamond has a crystal grain size approximately not greater than 500 nm.

The group V element is preferably dispersed in carbon as a substitutional isolated atom. A concentration of the group V element is, for example, approximately not lower than $1 \times 10^{14}/cm^3$ and not higher than $1 \times 10^{22}/cm^3$. The polycrystalline diamond can be fabricated by sintering graphite obtained by thermally decomposing a gas mixture of a gas containing the group V element and a hydrocarbon gas at a temperature not lower than 1500° C.

A method for manufacturing polycrystalline diamond according to yet another aspect of the present invention includes the steps of preparing graphite that a group V element is added to be dispersed in carbon at the atomic level, which has a crystal grain size not greater than 10 μm, and converting this graphite to diamond by subjecting graphite to heat treatment within high-temperature and high-pressure press equipment.

In the step of converting graphite to diamond, preferably, graphite is subjected to heat treatment within the high-temperature and high-pressure press equipment without adding a sintering aid or a catalyst. The step of preparing graphite may include the step of forming graphite on a base material by introducing a gas mixture of a gas containing the group V element and a hydrocarbon gas within a vacuum chamber and thermally decomposing the gas mixture at a temperature not lower than 1500° C. In the step of converting graphite to diamond, graphite formed on the base material may be subjected to heat treatment within the high-temperature and high-pressure press equipment. The gas mixture is preferably fed toward a surface of the base material. For example, a methane gas can be used as the hydrocarbon gas.

An electron emission source according to the present invention is made of the polycrystalline diamond described above.

Advantageous Effects of Invention

In the polycrystalline diamond according to the present invention, since an element of different type is added to be dispersed in carbon at the atomic level, an element of different type can be added to diamond with uniformity at an unprecedented level.

In the method for manufacturing polycrystalline diamond according to the present invention, since conversion to polycrystalline diamond is carried out by subjecting such graphite that an element of different type which is an element other than carbon is added to be dispersed in carbon at the atomic level to heat treatment within a vacuum chamber, polycrystalline diamond to which an element of different type has uniformly been added at an unprecedented level can be fabricated.

In the polycrystalline diamond according to another aspect of the present invention, since a group III element is added to be dispersed in carbon at the atomic level, a group III element can be added to diamond with uniformity at an unprecedented level and p-type conductivity can be provided to nano polycrystalline diamond.

In the method for manufacturing polycrystalline diamond according to another aspect of the present invention, since conversion to polycrystalline diamond is carried out by subjecting such graphite that a group III element is added to be dispersed in carbon at the atomic level to heat treatment within a vacuum chamber, nano polycrystalline diamond to which a group III element has uniformly been added at an unprecedented level can be fabricated and p-type conductivity can be provided to nano polycrystalline diamond.

Since the polycrystalline diamond according to the present invention also has excellent resistance to oxidation, it is useful for such tools as a scribe tool, a scribing wheel, a dresser, a rotating tool, an orifice for water jet, a wiredrawing die, and a cutting tool.

In the polycrystalline diamond according to yet another aspect of the present invention, since a group V element is added to be dispersed in carbon at the atomic level, a group V element can be added to diamond with uniformity at an unprecedented level and n-type conductivity can be provided to the polycrystalline diamond.

In the method for manufacturing polycrystalline diamond according to yet another aspect of the present invention, since conversion to polycrystalline diamond is carried out by subjecting such graphite that a group V element is added to be dispersed in carbon at the atomic level, which has a crystal grain size not greater than 10 μm, to heat treatment within high-temperature and high-pressure press equipment, polycrystalline diamond to which a group V element has uniformly been added at an unprecedented level can be fabricated. Though particles of at least several microns have conventionally segregated, according to the present invention, a group V element can uniformly be added to diamond to such a level as not allowing distinction with resolution of several microns and to such an extent that segregation of a compound other than diamond cannot be ascertained even with such high-intensity X-ray facilities as Spring 8, that is, such that a group V element is present as a substitutional element at a carbon position substantially at the atomic level. In addition, n-type conductivity can be provided to the polycrystalline diamond and the polycrystalline diamond has electron emission characteristics.

Since the electron emission source according to the present invention is made of the polycrystalline diamond described above, it has both of excellent electron emission characteristics and durability.

DESCRIPTION OF EMBODIMENTS

An embodiment of the present invention will be described hereinafter with reference to FIG. 1.

Different-type-element-added nano polycrystalline diamond in the present embodiment contains an element of different type added to be dispersed at the atomic level in carbon forming a body of the polycrystalline diamond. Here, an "element of different type" herein refers to an element which can be added to diamond, is other than carbon forming diamond, and is not an inevitable impurity contained in diamond. As an element of different type, for example, nitrogen, hydrogen, a group III element, a group V element, silicon, a metal such as a transition metal, rare earth, and the like can be exemplified. It is noted that a single element of different type alone can be added to diamond and a plurality of elements of different type may simultaneously be added to diamond.

Figure 1:
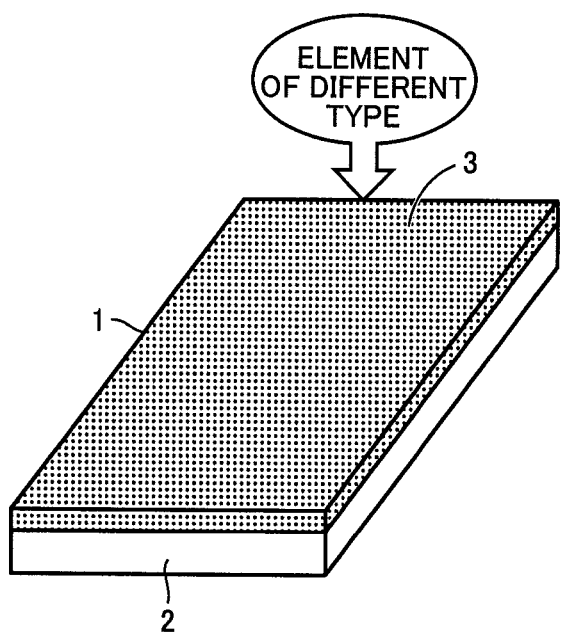
FIG. 1 is a perspective view showing a state that polycrystalline diamond in one embodiment of the present invention is fabricated on a base material.

As shown in FIG. 1, nano polycrystalline diamond 1 in the present embodiment is formed on a base material 2 and contains an element of different type 3 uniformly dispersed at the atomic level. It is noted that "dispersed at the atomic level" herein refers, for example, to a dispersed state at such a level that, when carbon and an element of different type are mixed in a vapor phase state and solidified to thereby fabricate solid carbon in a vacuum atmosphere, the element of different type is dispersed in solid carbon. Namely, this state is such a state that an element precipitated as isolated or a compound other than diamond is not formed.

Nano polycrystalline diamond 1 can be fabricated by subjecting graphite formed on the base material to heat treatment. Graphite is an integral solid and contains a crystallized portion. Though polycrystalline diamond 1 has a flat-plate shape in the example in FIG. 1, it is possible to have any shape and thickness. In the case that nano polycrystalline diamond 1 is fabricated by subjecting graphite formed on the base material to heat treatment, nano polycrystalline diamond 1 and graphite basically have the same shape.

The element of different type above can be added to graphite in the stage of formation of graphite. Specifically, graphite can be formed on the base material by thermally decomposing a gas mixture of a gas containing the element of different type and a hydrocarbon gas at a temperature not lower than 1500° C. so that at the same time, the element of different type can be added to graphite. Thus, by mixing the element of different type in a source material gas for formation of graphite in a vapor phase state to thereby add the element of different type to graphite, the element of different type can uniformly be added to graphite at the atomic level. In addition, by appropriately adjusting an amount of addition of a gas containing the element of different type to the hydrocarbon gas, a desired amount of element of different type can uniformly be added at the atomic level.

The gas mixture can thermally be decomposed within a vacuum chamber, and by setting a degree of vacuum within the vacuum chamber to be relatively high here, introduction of an impurity into graphite can be suppressed. Actually, however, an unintended inevitable impurity is introduced in graphite. An element such as nitrogen, hydrogen, oxygen, boron, silicon, and a transition metal, other than the element of different type above, can be exemplified as this inevitable impurity.

In graphite used for fabricating different-type-element-added nano polycrystalline diamond in the present embodiment, an amount of each inevitable impurity is approximately 0.01 mass % or lower. Namely, a concentration of an inevitable impurity in graphite is approximately not higher than a detection limit in SIMS (Secondary Ion Mass Spectrometry) analysis. In addition, a concentration of a transition metal in graphite is approximately not higher than a detection limit in ICP (Inductively Coupled Plasma) analysis or SIMS analysis.

Thus, in the case that an amount of an impurity in graphite is lowered down to a level of the detection limit in SIMS analysis or ICP analysis and diamond is made of this graphite, diamond extremely small in an amount of impurity other than an element of different type, of which addition has been intended, can be fabricated. It is noted that, even when graphite containing an impurity slightly more than the detection limit in SIMS analysis or ICP analysis is employed, diamond having characteristics significantly better than in a conventional example is obtained.

Nano polycrystalline diamond in the present embodiment uniformly contains an element of different type at the atomic level as above and an amount of an impurity therein is also extremely small. In the nano polycrystalline diamond, atoms of the element of different type do not aggregate as clusters in carbon but they are substantially uniformly dispersed over the entire diamond. Ideally, atoms of the element of different type are present as isolated from one another in carbon.

As described above, since nano polycrystalline diamond in the present embodiment contains the element of different type dispersed in carbon at the atomic level, nano polycrystalline diamond to which the element of different type has uniformly been added at an unprecedented level is obtained. In addition, since the element of different type can uniformly be dispersed in nano polycrystalline diamond at the atomic level, desired characteristics and functions can effectively be provided to diamond. For example, by adding an appropriate element, mechanical characteristics of diamond can be improved; for example, wear resistance of diamond can effectively be enhanced. Electrical characteristics of diamond can also be improved; for example, conductivity can be provided to diamond. In addition, optical characteristics of diamond can also be improved, for example, by uniformly coloring the diamond.

For example, nitrogen can be selected as an element of different type. In this case, nitrogen can be dispersed in diamond at the atomic level. Namely, nitrogen atoms can be introduced in diamond as isolated. Here, nitrogen atoms are present in carbon (the diamond body) in a state substituted for carbon atoms. Namely, nitrogen atoms are not simply introduced in carbon but in such a state that nitrogen atoms and carbon atoms are chemically bonded to each other.

Normally, in the case that graphite containing nitrogen as a gas in pores is directly converted to diamond at such a high temperature as 2300° C. and such a high pressure as 20 GPa, nitrogen of approximately several hundred ppm is introduced in diamond as aggregated, and isolated nitrogen in diamond is approximately 1 ppm or lower. This isolated nitrogen is important for coloring of diamond, and diamond containing isolated nitrogen exhibits a color from yellow to orange. When this diamond is irradiated with electron beams and heated at a high temperature not lower than 600° C., coloring of red or pink is observed, which means that, through the treatment as above, a defect absorbing light around 550 nm and emitting light around 638 nm, which is called an NV (Nitrogen Vacancy) defect which is combination of nitrogen and a defect, has been generated. This NV defect is not generated without nitrogen present as isolated and as a substitutional atom. On the other hand, nitrogen introduced in diamond as aggregated does not substantially contribute to coloring of diamond.

In nano polycrystalline diamond in the present embodiment to which nitrogen has been added, since nitrogen is dispersed in diamond at the atomic level, there is substantially no nitrogen introduced as aggregated in diamond. Therefore, when nano polycrystalline diamond is irradiated with electron beams and heated at a high temperature not lower than 600° C., diamond can be colored to red or the like. In addition, added nitrogen does not aggregate at a crystal grain boundary of diamond and there is very little impurity in diamond. Therefore, abnormal growth of a diamond crystal can also effectively be suppressed. Consequently, colored nano polycrystalline diamond is obtained, although it is a polycrystalline body having a crystal grain size (a maximum length of a crystal grain) from 10 to 500 nm.

In addition, in nano polycrystalline diamond in the present embodiment, since such an element of different type as nitrogen described above is dispersed in the diamond body at the atomic level, concentration distribution of the element of different type in diamond is also less likely. From this fact as well, local abnormal growth of diamond crystal grains can effectively be suppressed. Consequently, as compared with a conventional example, sizes of crystal grains of diamond can also be the same.

A concentration of an element of different type in diamond can arbitrarily be set. A high or low concentration of an element of different type can be set. In any case, since an element of different type can be dispersed in diamond at the atomic level, generation of concentration distribution of the element of different type in diamond can effectively be suppressed. It is noted that a concentration of an added element of different type is preferably within a range approximately from $10^{14}$ to $10^{22}/cm^3$ in total, in order to maintain a crystal grain size of polycrystalline diamond within a range approximately from 10 to 50 nm.

A method for manufacturing different-type-element-added nano polycrystalline diamond in the present embodiment will now be described.

Initially, in a vacuum chamber, a base material is heated to a temperature approximately not lower than 1500° C. and not higher than 3000° C. A well known technique can be adopted as a heating method. For example, it is possible that a heater capable of directly or indirectly heating the base material to a temperature not lower than 1500° C. is provided in the vacuum chamber.

Any metal, inorganic ceramic material, or carbon material can be used as the base material, so long as it is a material capable of withstanding a temperature approximately from 1500° C. to 3000° C. From a point of view of not introducing an impurity in graphite serving as a source material, however, the base material is preferably made of carbon. More preferably, it is possible that the base material is composed of diamond or graphite containing very little impurity. In this case, at least a surface of the base material should only be composed of diamond or graphite.

Then, a hydrocarbon gas and a gas containing an element of different type are introduced in the vacuum chamber. Here, a degree of vacuum within the vacuum chamber is set approximately to 20 to 100 Torr. Thus, the hydrocarbon gas and the gas containing the element of different type can be mixed within the vacuum chamber, and graphite in which the element of different type has been taken at the atomic level can be formed on the heated base material. In addition, in the case that a compound is introduced as a source of an element of different type as well, an unnecessary component does not remain. It is noted that the base material may be heated after introduction of the gas mixture and then graphite containing the element of different type may be formed on the base material.

For example, a methane gas can be used as the hydrocarbon gas. A gas of a hydride or an organic compound of an element of different type is preferably adopted as the gas containing the element of different type. By adopting a hydride as the element of different type, the hydride of the element of different type can readily be decomposed at a high temperature. Alternatively, by adopting an organic compound as the element of different type, such a state that the element of different type is surrounded by carbon, that is, the element of different type is isolated from each other, can be established. Thus, the element of different type as isolated is readily taken into graphite.

When nitrogen is selected as an element of different type, for example, a gas of methyl amine or an analogue thereof can be employed. In the case that a methane gas and a methyl amine gas are bubbled in an argon gas to make a gas mixture, the gas mixture can be introduced in the vacuum chamber at a ratio from $10^{-7}\%$ to 100%.

In forming graphite, the hydrocarbon gas and the gas containing the element of different type are preferably fed toward the surface of the base material. Thus, the gases can be mixed efficiently in the vicinity of the base material, so that graphite containing the element of different type can efficiently be generated on the base material. The hydrocarbon gas and the different-type-element-containing gas may be supplied from directly above the base material toward the base material, or may be supplied toward the base material in an oblique direction or in a horizontal direction. It is also possible that a guide member for guiding the hydrocarbon gas and the different-type-element-containing gas to the base material is provided in the vacuum chamber.

Graphite that an element of different type which is an element other than carbon is added to be dispersed in carbon at the atomic level, which is manufactured as described above, is sintered in high-pressure press equipment, so that different-type-element-added nano polycrystalline diamond to which the element of different type has uniformly been added at an unprecedented level can be fabricated. Namely, after sintering of graphite, nano polycrystalline diamond having crystal grains of a nano size is obtained. For example, the polycrystalline diamond can have a crystal grain size approximately from 10 to 500 nm.

It is noted that, in the step of converting graphite to diamond, graphite is preferably subjected to heat treatment at a high pressure without adding a sintering aid or a catalyst. In addition, in the step of converting graphite to diamond, graphite formed on the base material may be subjected to heat treatment within ultra-high-pressure equipment.

With the method in the present embodiment, even an element which is normally difficult to add to diamond can be confined as isolated within diamond crystals, owing to abrupt generation of crystals.

Graphite which can be used for fabrication of nano polycrystalline diamond in the present embodiment is, for example, crystalline graphite partially containing a crystallized portion or polycrystalline. Density of graphite is preferably higher than 0.8 g/cm³. Thus, volume change during sintering of graphite can be made smaller. From a point of view of making volume change during sintering of graphite smaller and improving yield, experimentally, density of graphite is further preferably approximately not lower than 1.4 g/cm$^3$ and not higher than 2.0 g/cm$^3$.

The reason why density of graphite is within the range above is because it is considered that, when density of graphite is lower than 1.4 g/cm$^3$, volume change during a high-temperature and high-pressure process is too large and temperature control may become impossible. In addition, it is because, when density of graphite is higher than 2.0 g/cm$^3$, probability of occurrence of crack in diamond may be twice or higher.

Examples of the present invention will now be described.

EXAMPLE 1

A methane gas and methyl amine were mixed at 1:1 in the vacuum chamber, and the gas mixture above was blown onto a diamond base material heated to 1900° C. Here, a degree of vacuum within the vacuum chamber was set to 20 to 30 Torr. Then, graphite containing nitrogen deposited on a substrate. Bulk density of this graphite was 2.0 g/cm$^3$.

Graphite above was converted to diamond at a synthesis temperature of 2300° C. and at 15 GPa, to thereby obtain nano polycrystalline diamond to which nitrogen was added. The polycrystalline diamond had a crystal grain size from 10 to 200 nm. When this polycrystalline diamond was irradiated with electron beams and annealed at a high temperature of 800° C., red nano polycrystalline diamond was obtained.

EXAMPLE 2

A methane gas and trimethyl amine were mixed at 1:1 in the vacuum chamber, and the gas mixture above was blown onto a diamond base material heated to 1900° C. Here, a degree of vacuum within the vacuum chamber was set to 20 to 30 Torr. Then, graphite containing nitrogen deposited on a substrate. Bulk density of this graphite was 2.0 g/cm$^3$. As a result of ICP element analysis, a concentration of nitrogen in graphite was 100 ppm.

Graphite above was converted to diamond at a synthesis temperature of 2300° C. and at 15 GPa, to thereby obtain nano polycrystalline diamond to which nitrogen was added. The polycrystalline diamond had a crystal grain size from 10 to 200 nm. When this polycrystalline diamond was irradiated with electron beams and annealed at a high temperature of 800° C., light red nano polycrystalline diamond was obtained.

EXAMPLE 3

A methane gas and methyl amine were mixed at 1:1 in the vacuum chamber, and the gas mixture above was blown onto a diamond base material heated to 1900° C. Here, a degree of vacuum within the vacuum chamber was set to 100 Torr. Then, graphite containing nitrogen deposited on a substrate. Bulk density of this graphite was 2.0 g/cm$^3$. As a result of ICP element analysis, a concentration of nitrogen in graphite was 100 ppm.

Graphite above was converted to diamond at a synthesis temperature of 2300° C. and at 15 GPa, to thereby obtain nano polycrystalline diamond to which nitrogen was added. The polycrystalline diamond had a crystal grain size from 10 to 200 nm. When this polycrystalline diamond was irradiated with electron beams and annealed at a high temperature of 800° C., red nano polycrystalline diamond was obtained.

EXAMPLE 4

A methane gas and trimethyl amine were mixed at 1:1 in the vacuum chamber, and the gas mixture above was blown onto a diamond base material heated to 1900° C. Here, a degree of vacuum within the vacuum chamber was set to 100 Torr. Then, graphite containing nitrogen deposited on a substrate. Bulk density of this graphite was 2.0 g/cm$^3$. As a result of ICP element analysis, a concentration of nitrogen in graphite was 150 ppm.

Graphite above was converted to diamond at a synthesis temperature of 2300° C. and at 15 GPa, to thereby obtain nano polycrystalline diamond to which nitrogen was added. The polycrystalline diamond had a crystal grain size from 10 to 200 nm. When this polycrystalline diamond was irradiated with electron beams and annealed at a high temperature of 800° C., light red nano polycrystalline diamond was obtained.

COMPARATIVE EXAMPLE 1

Commercially available graphite was sealed in a nitrogen atmosphere and nano polycrystalline diamond was synthesized directly from graphite under a high-temperature and high-pressure condition of 2300° C. and 15 GPa. Then, a concentration of nitrogen in the polycrystalline diamond was 100 ppm. Even when this polycrystalline diamond was irradiated with electron beams and annealed at 800° C., however, diamond did not have red color, which means that isolated nitrogen in diamond was very little, which was approximately 1 ppm or lower.

In Examples above, it could be confirmed that, by setting a degree of vacuum in the vacuum chamber to 20 to 100 Torr, mixing the hydrocarbon gas and a gas containing nitrogen within the vacuum chamber, and supplying the gas mixture onto the base material heated to a temperature around 1900° C., graphite having a solid phase and bulk density around 2.0 g/cm$^3$, in which nitrogen had been dispersed at the atomic level, could be fabricated on the base material. In addition, it could also be confirmed that, by converting graphite to diamond at a synthesis temperature of 2300° C. and at 15 GPa, nano polycrystalline diamond having a crystal grain size (a maximum length of a crystal grain) approximately from 10 to 200 nm, in which nitrogen was dispersed at the atomic level, could be fabricated. It is considered, however, that nano polycrystalline diamond having excellent characteristics could be fabricated within the scope described in Scope of Claims for patent even though conditions are out of the range above.

An embodiment of another type of the present invention will be described hereinafter with reference to FIGS. 2 to 3.

Group-III-element-added nano polycrystalline diamond in the present embodiment contains a group III element which is added to be dispersed at the atomic level in carbon forming a polycrystalline diamond body. In addition, nano polycrystalline diamond in the present embodiment is polycrystalline diamond not containing a binder and having a crystal grain size of a nano size.

A group III element is an element which can have a bond smaller by 1 in the number of electrons than carbon and it is an element serving as an acceptor in diamond. For example, boron, aluminum, gallium, indium, thallium, and the like can be exemplified as group III elements. Though one or more elements selected from these elements can be employed, other elements having a similar function may be employed. Among the group III elements, boron is suitable, however, mixed elements which are combination of boron and another element can also be employed.

Figure 2:
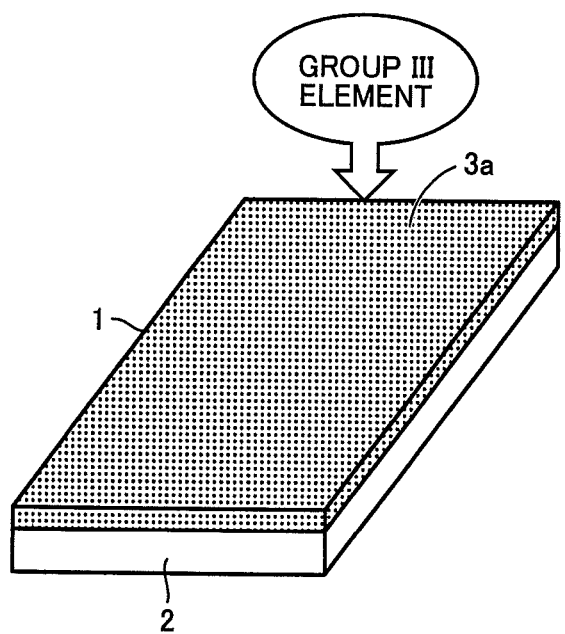
FIG. 2 is a perspective view showing a state that polycrystalline diamond in another embodiment of the present invention is fabricated on a base material.

As shown in FIG. 2, nano polycrystalline diamond 1 in the present embodiment is formed on base material 2 and contains a group III element 3a uniformly dispersed at the atomic level. It is noted that the "group III element dispersed at the atomic level" herein refers, for example, to a dispersed state at such a level that, when carbon and a group III element are mixed in a vapor phase state and solidified to thereby fabricate solid carbon in a vacuum atmosphere, the group III element is dispersed in the solid carbon.

Nano polycrystalline diamond 1 can be fabricated by subjecting graphite formed on the base material to heat treatment at a high temperature and a high pressure. Graphite is an integral solid and contains a crystallized portion. Though nano polycrystalline diamond 1 has a flat-plate shape in the example in FIG. 2, it is possible to have any shape and thickness. In the case that nano polycrystalline diamond 1 is fabricated by subjecting graphite formed on the base material to heat treatment, nano polycrystalline diamond 1 and graphite basically have the same shape.

The group III element above can be added to graphite in the stage of formation of graphite. Specifically, graphite can be formed on the base material by thermally decomposing a gas mixture of a gas containing a group III element and a hydrocarbon gas at a temperature not lower than 1500° C. so that at the same time, the group III element can be added to graphite.

As the gas containing the group III element above, for example, any of a first gas composed of a hydride of a group III element, a second gas of an organic metal base which is composed of a gas of one or more selected from trimethylboron, triethylboron, and trimethyl borate, a third gas of an organic metal base which is composed of a gas of one or more selected from trimethylaluminum, triethylaluminum, dimethyl aluminum hydride, and triisobutylaluminum, a fourth gas of an organic metal base which is composed of a gas of one or more selected from trimethylgallium and triethylgallium, a fifth gas of an organic metal base which is composed of a gas of one or more selected from trimethylindium and triethylindium, and a sixth gas of an organic metal base which is composed of a gas of one or more selected from trimethylthallium and triethylthallium can be employed. It is also possible that two or more of the gases above are mixed as appropriate.

As described above, by mixing a group III element in a source material gas for formation of graphite in a vapor phase state to thereby add the group III element to graphite, the group III element can uniformly be added to graphite at the atomic level. In addition, by appropriately adjusting an amount of addition of a gas containing the group III element to the hydrocarbon gas, a desired amount of group III element can be added to graphite.

The gas mixture can thermally be decomposed in a vacuum chamber, and by setting a degree of vacuum within the vacuum chamber to be relatively be high here, introduction of an impurity into graphite can be suppressed. Actually, however, an unintended inevitable impurity is introduced in graphite. An element such as nitrogen, hydrogen, oxygen, silicon, and a transition metal, other than the group III element above of which addition has been intended, can be exemplified as this inevitable impurity.

In graphite used for fabricating group-III-element-added nano polycrystalline diamond in the present embodiment, an amount of each inevitable impurity is approximately 0.01 mass % or lower. Namely, a concentration of an inevitable impurity in graphite is approximately not higher than the detection limit in SIMS (Secondary Ion Mass Spectrometry) analysis. In addition, a concentration of a transition metal in graphite is approximately not higher than the detection limit in ICP (Inductively Coupled Plasma) analysis or SIMS analysis.

Thus, in the case that an amount of an impurity in graphite is lowered down to a level of the detection limit in SIMS analysis or ICP analysis and diamond is made of this graphite, polycrystalline diamond extremely small in an amount of impurity other than a group III element, of which addition has been intended, can be fabricated. It is noted that, even when graphite containing an impurity slightly more than the detection limit in SIMS analysis or ICP analysis is employed, polycrystalline diamond having characteristics significantly better than in the conventional example is obtained.

Figure 3:
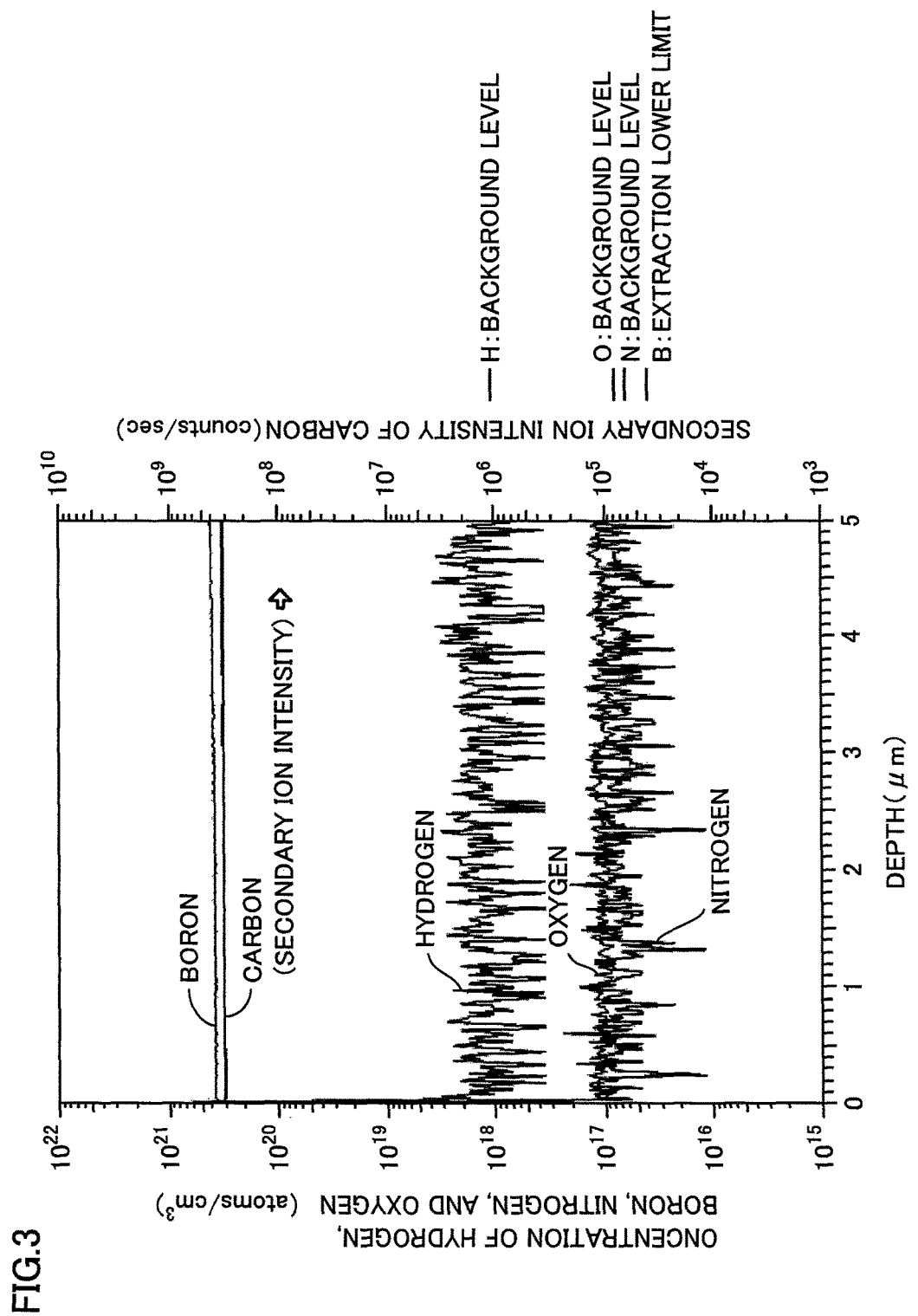
FIG. 3 is a diagram showing one example of distribution of an impurity in boron-added nano polycrystalline diamond in another embodiment of the present invention.

FIG. 3 shows one example of distribution of boron and an impurity in the nano polycrystalline diamond in the present embodiment. It is noted that boron-added nano polycrystalline diamond shown in FIG. 3 was obtained by subjecting graphite containing boron representing the group III element described above to heat treatment at 2000° C. in a vacuum atmosphere of $10^{-2}$ Pa. In addition, a boron concentration or an impurity concentration was measured in SIMS analysis.

As shown in FIG. 3, it can be seen that variation in a direction of depth, of a boron concentration and a concentration of each impurity in diamond is less. In addition, it can be seen that an amount of an impurity in the nano polycrystalline diamond in the present embodiment is at an extremely low value.

Table 1 below shows results of comparison of a ratio of introduction of $B_4C$, between boron-added nano polycrystalline diamond in the present embodiment and boron-added nano polycrystalline diamond obtained by mixing $B_4C$ serving as a boron source and graphite fabricated with the conventional technique, subjecting the mixture to heat treatment at 2000° C. in a vacuum atmosphere of $10^{-2}$ Pa, and forming a solid solution of graphite with boron.

TABLE 1

| Boron Concentration | $B_4C$ Introduction Ratio | |
| --- | --- | --- |
| (Amount of Preparation) | Mixed Boron for Doping | Present Inventive Example |
| 0.05% | 0.01% | <0.01% |
| 0.10% | 0.02% | <0.01% |
| 0.25% | 0.05% | <0.01% |
| 0.50% | 0.10% | <0.01% |
| 1.00% | 0.20% | <0.01% |
| 5.00% | 1.00% | <0.01% |

As shown in Table 1, it can be seen that, in boron-added nano polycrystalline diamond obtained by forming a solid solution of graphite with boron, as a concentration of added boron increases, a ratio of introduction of $B_4C$ becomes higher, whereas in boron-added nano polycrystalline diamond in the present embodiment, even though a concentration of added boron increases, a ratio of introduction of $B_4C$ is extremely low, that is, lower than 0.01 mass %.

Nano polycrystalline diamond in the present embodiment uniformly contains a group III element at the atomic level as above, while an amount of an impurity is extremely small. In this nano polycrystalline diamond, atoms of the group III element do not aggregate as clusters in carbon, but they are substantially uniformly dispersed over the entire diamond. Ideally, atoms of the group III element are present as isolated from one another in carbon. Atoms of the group III element are present in carbon (the diamond body) in a state substituted for carbon atoms, and they are not simply introduced in carbon but in such a state that atoms of the group III element and carbon atoms are chemically bonded to each other.

As described above, since nano polycrystalline diamond in the present embodiment contains the group III element dispersed in carbon at the atomic level, nano polycrystalline diamond to which the group III element has uniformly been added at an unprecedented level is obtained. In addition, since the group III element can uniformly be dispersed in nano polycrystalline diamond at the atomic level, desired p-type conductivity can be provided to the entire diamond.

In nano polycrystalline diamond in the present embodiment to which a group III element has been added, since the group III element is dispersed in diamond at the atomic level, there is substantially no group III element introduced in diamond as aggregated as described above. In addition, the added group III element does not aggregate at a crystal grain boundary of diamond and there is very little impurity in diamond. Therefore, abnormal growth of a diamond crystal can also effectively be suppressed. Consequently, nano polycrystalline diamond having a crystal grain size (a maximum length of a crystal grain) of a nano size such as from 10 to 500 nm and having p-type conductivity is obtained.

Furthermore, in nano polycrystalline diamond in the present embodiment, concentration distribution of the group III element in diamond is also less likely. From this fact as well, local abnormal growth of crystal grains of diamond can effectively be suppressed. Consequently, as compared with a conventional example, sizes of crystal grains of diamond can also be the same.

A concentration of a group III element in diamond can arbitrarily be set. A high or low concentration of a group III element in diamond can be set. In any case, since a group III element can uniformly be dispersed in diamond, generation of concentration distribution of the group III element in diamond can effectively be suppressed. Thus, occurrence of local variation of conductivity in diamond can also effectively be suppressed.

It is noted that a concentration of an added group III element is preferably within a range approximately from $10^{14}$ to $10^{22}/cm^3$, in order to provide p-type conductivity to diamond. In order to provide good conductivity like a metal to diamond, a concentration of an added group III element is preferably not lower than approximately $10^{19}/cm^3$, and in order to provide a property as a semiconductor to diamond, a concentration of an added group III element is approximately from $10^{14}$ to less than $10^{19}/cm^3$.

Though there were concerns about lowering in hardness as compared with non-doped nano polycrystalline diamond by addition of a group III element as above, hardness was comparable. Namely, group-III-element-added nano polycrystalline diamond in the present embodiment has hardness equivalent to that of non-doped nano polycrystalline diamond and has p-type conductivity.

When nano polycrystalline diamond in the present embodiment was used to fabricate, for example, a cutting tool, it was found that the cutting tool had cutting performance and life (wear resistance characteristics) equal to or higher than those of non-doped nano polycrystalline diamond, while it had conductivity. In addition, the cutting tool also had such an advantage that adhesion of swarf due to static electricity was suppressed because nano polycrystalline diamond had conductivity, even when an insulating material was cut. Applications of nano polycrystalline diamond in the present embodiment will be described in detail later.

A method for manufacturing group-III-element-added nano polycrystalline diamond in the present embodiment will now be described.

Initially, in a vacuum chamber, a base material is heated to a temperature approximately not lower than 1500° C. and not higher than 3000° C. A well known technique can be adopted as a heating method. For example, it is possible that a heater capable of directly or indirectly heating the base material to a temperature not lower than 1500° C. is provided in the vacuum chamber.

Any metal, inorganic ceramic material, or carbon material can be used as the base material, so long as it is a material capable of withstanding a temperature approximately from 1500° C. to 3000° C. From a point of view of not introducing an impurity in graphite serving as a source material, however, the base material is preferably made of carbon. More preferably, it is possible that the base material is composed of diamond or graphite containing very little impurity. In this case, at least a surface of the base material should only be composed of diamond or graphite.

Then, a hydrocarbon gas and a gas containing a group III element are introduced in the vacuum chamber. Here, a degree of vacuum within the vacuum chamber is set approximately to 20 to 100 Torr. Thus, the hydrocarbon gas and the gas containing the group III element can be mixed within the vacuum chamber. By thermally decomposing this gas mixture at a temperature not lower than 1500° C., graphite in which the group III element has been taken at the atomic level can be formed on the base material. It is noted that the base material may be heated after introduction of the gas mixture and then graphite containing the group III element may be formed on the base material.

For example, a methane gas can be used as the hydrocarbon gas. Various gases described above can be employed as the gas containing the group III element. The gas mixture of the hydrocarbon gas and the gas containing the group III element can be introduced in the vacuum chamber at a ratio, for example, from $10^{-7}\%$ to 100%.

In forming graphite, the hydrocarbon gas and the gas containing the group III element are preferably fed toward the surface of the base material. Thus, the gases can be mixed efficiently in the vicinity of the base material, so that graphite containing the group III element can efficiently be generated on the base material. The hydrocarbon gas and the group-III-element-containing gas may be supplied from directly above the base material toward the base material, or may be supplied toward the base material in an oblique direction or in a horizontal direction. It is also possible that a guide member for guiding the hydrocarbon gas and the group-III-element-containing gas to the base material is provided in the vacuum chamber.

Graphite that a group III element has been added to be dispersed in carbon at the atomic level, which is manufactured as described above, is sintered at a high temperature and at a high pressure with the use of high-pressure press equipment or the like, so that group-III-element-added nano polycrystalline diamond to which the group III element has uniformly been added at an unprecedented level can be fabricated.

It is noted that, in the step of converting graphite to diamond, graphite is preferably subjected to heat treatment at a high pressure without adding a sintering aid or a catalyst. In addition, in the step of converting graphite to diamond, graphite formed on the base material may be subjected to heat treatment at a high temperature not lower than 1500° C. and at a high pressure not lower than 8 GPa.

Graphite which can be used for fabrication of nano polycrystalline diamond in the present embodiment is, for example, crystalline graphite partially containing a crystallized portion or polycrystalline. Density of graphite is preferably higher than 0.8 g/cm³. Thus, volume change during sintering of graphite can be made smaller. From a point of view of making volume change during sintering of graphite smaller and improving yield, experimentally, density of graphite is further preferably approximately not lower than 1.4 g/cm³ and not higher than 2.0 g/cm³.

The reason why density of graphite is within the range above is because it is considered that, when density of graphite is lower than 1.4 g/cm³, volume change during a high-temperature and high-pressure process is too large and temperature control may become impossible. In addition, it is because, when density of graphite is higher than 2.0 g/cm³, probability of occurrence of crack in diamond may be twice or higher.

Applications of nano polycrystalline diamond in the present embodiment will now be described.

In p-type diamond to which such an acceptor as boron has been added, a part of tetravalent carbon is occupied by trivalent atoms. In this case, though one covalently bonded electron is short in a system, an electron is externally obtained and thus a diamond structure can be maintained.

On the other hand, in a case of n-type diamond, when donors are activated and electrons are emitted, those electrons occupy an energy state created by a conduction band, that is, created by the band of formation of antibonding orbital. Therefore, it is considered that diamond bond tends to be weaker.

In contrast, in the case of an acceptor, it is considered that bonding strength of diamond is higher because non-bonding covalent bond is completely satisfied as a result of reception of one electron. Namely, by adding an acceptor to diamond, improvement in heat resistance characteristics or wear resistance of diamond can be expected.

For example, in boron-added nano polycrystalline diamond in the present embodiment, since boron can be dispersed in diamond at the atomic level, even when a large amount of boron which is an element of different type is added to diamond, mechanical characteristics of diamond are not at all impaired. Therefore, nano polycrystalline diamond in the present embodiment has Knoop hardness as high as that of nano polycrystalline diamond which is non-doped and binderless. Such nano polycrystalline diamond is useful for tools used in various types of machining.

The inventors of the present application fabricated a cutting tool by using boron-added nano polycrystalline diamond fabricated with the technique in the present embodiment and containing boron by 0.1 mass %, 0.3 mass %, or 0.6 mass %, and actually cut an aluminum material. Then, even after cutting by 30 km, an amount of wear of a flank face was as small as 3 µm or less. In contrast, a cutting tool was fabricated with non-doped nano polycrystalline diamond and similar tests were conducted. Then, an amount of wear of a flank face was at least twice as much as that of a case of boron-added nano polycrystalline diamond above.

In addition, boron-added nano polycrystalline diamond in the present embodiment, polycrystalline diamond to which boron has been added with the conventional technique, non-doped nano polycrystalline diamond, and single-crystal diamond were prepared, and they were polished with a grindstone of #1500 at 250 rpm for 30 minutes, with load of 2.5 kg being applied. Then, it could be confirmed that an amount of wear of boron-added nano polycrystalline diamond in the present embodiment was extremely small, that is, from 0.01 to 0.02 µm/minute. It is noted that an amount of wear of other diamonds including non-doped nano polycrystalline diamond was at least 5 times as much as an amount of wear of boron-added nano polycrystalline diamond in the present embodiment.

From the foregoing, it could be confirmed that excellent wear resistance was obtained by fabricating a tool with boron-added nano polycrystalline diamond in the present embodiment.

Since nano polycrystalline diamond in the present embodiment has conductivity, it can also be applied to electric discharge machining. More specifically, nano polycrystalline diamond in the present embodiment can be applied to a tool for fabricating a complicated three-dimensional shape such as a concavely curved surface.

For example, when boron is added to polycrystalline diamond, in order to obtain a conductor applicable to electric discharge machining, a concentration of boron to be added to diamond is preferably within a range approximately from $10^{20}$ to $10^{22}$/cm³. Here, if a concentration of added boron is higher than $10^{22}$/cm³, there are concerns about difficulty in achieving homogenous dispersion of boron in diamond and impairment of mechanical characteristics of polycrystalline diamond. Therefore, a concentration of boron to be added to diamond as above is preferably not higher than $10^{22}$/cm³.

The inventors of the present application also found that, by adding boron to nano polycrystalline diamond with the technique in the present embodiment, heat resistance in an oxygen-containing atmosphere (resistance to oxidation) could be improved as compared with non-doped nano polycrystalline diamond to which no element of different type was added.

When the present inventors of the present application fabricated boron-added nano polycrystalline diamond containing boron by 0.1 mass %, 0.3 mass %, or 0.6 mass % with the technique in the present embodiment, prepared non-doped nano polycrystalline diamond as a Comparative Example, and measured an amount of remaining diamond after heat treatment for 1 hour at a temperature from 500° C. to 900° C., an amount of remaining boron-added nano polycrystalline diamond in the present embodiment was at least 4 times as high as an amount of remaining non-doped nano polycrystalline diamond. Namely, it could be confirmed that boron-added nano polycrystalline diamond in the present embodiment had heat resistance excellent in an oxygen-containing atmosphere (resistance to oxidation).

In the case that polycrystalline diamond is used for a cutting tool, even when a cutting edge of the tool is cooled with a cutting fluid or mist during cutting, a temperature of the cutting edge of the tool is close to 1000° C. due to sliding with respect to a work material at a cutting point. Therefore, in the case that polycrystalline diamond is used for a cutting tool, excellent resistance to oxidation is also required.

In the case of boron-added nano polycrystalline diamond according to the present embodiment, when it is exposed to a high temperature in an oxygen-containing atmosphere, a film of an oxide of boron is formed on a surface of nano polycrystalline diamond. Therefore, boron-added nano polycrystalline diamond according to the present embodiment has resistance to oxidation better than normal polycrystalline diamond. Therefore, nano polycrystalline diamond in the present embodiment is useful also for a cutting tool, and with the use of nano polycrystalline diamond, working of a complicated shape can also be achieved. In addition, tool life can also be extended, and a cutting tool capable of working with high shape accuracy being maintained can be provided.

Furthermore, in boron-added nano polycrystalline diamond above, since boron has been dispersed in diamond at the atomic level, a film of an oxide of boron can substantially uniformly be formed on the entire surface of diamond exposed to a high temperature in an oxygen-containing atmosphere. Therefore, resistance to oxidation is extremely high and the effect described above is noticeable.

In using insulating nano polycrystalline diamond for a tool, a method of working diamond is restricted. More specifically, a method for precisely finishing a cutting edge to a level allowing use as a tool substantially has to rely on mechanical polishing. Therefore, insulating nano polycrystalline diamond is applicable only to a tool having a two-dimensional shape. Specifically, a shape of a tool is limited to a rectangular cutting tool or a V-shaped cutting tool formed only of flat surfaces manufactured also with single-crystal diamond, an R cutting tool formed with a flat surface and one curved surface, or the like. For a rotating tool as well, a shape is limited to a simple shape formed with flat surfaces, such as a ball end mill having a cutting edge shape made by cutting a part of an arc of a planar R cutting tool and a drill having four corners of a quadrangular pyramid as cutting edges.

In contrast, in the case of conductive nano polycrystalline diamond in the present embodiment, since it is excellent in resistance to oxidation, various methods of polishing a cutting edge can be adopted. Therefore, it is applicable to a cutting tool or a rotating tool in a shape more complicated than in the case of insulating nano polycrystalline diamond.

On the other hand, with increase in area of an optical element, a size of a mold has increased and demands for tools high in wear resistance and capable of continuous cutting of a mold of a large area have also increased. Since nano polycrystalline diamond in the present embodiment is excellent also in wear resistance, it is also applicable to such a tool.

Single-crystal diamond has conventionally been employed for a material for an orifice for water jet. In single-crystal diamond, however, an amount of wear is different depending on its crystal orientation (uneven wear), and hence an intended cutting width cannot be obtained with lapse of time of use.

For example, an amount of wear is significantly different between a (111) plane and a (100) plane of single-crystal diamond, while an orifice made of single-crystal diamond has planes of various crystal orientations in a circumferential direction of an inner surface of an orifice hole. Therefore, even though the inner surface of the orifice hole has a cylindrical shape at the time when use was started, as the orifice is used, wear of a surface which is likely to wear proceeds in a short period of time, the cylindrical shape loses its shape, and the shape of the inner face of the orifice hole expands from the cylindrical shape to a polygonal shape such as a hexagonal shape. Consequently, such a problem that an intended cutting width as described above cannot be obtained arises.

As measures against uneven wear above, use of sintered diamond is possible. Sintered diamond is fabricated by sintering diamond particles with the use of a metal binder such as cobalt, and the metal binder is present among diamond particles. A portion of the metal binder, however, is softer than the diamond particles. Therefore, wear proceeds again in a short period of time. When the binder decreases, diamond particles also fall off, the orifice hole is expanded, and there is a problem that a cutting width stable for a long period of time cannot be obtained. In particular, in the case of a water jet aiming to improve cutting efficiency, a solution obtained by adding hard particles (alumina or the like) to water is injected at a high pressure. Therefore, the portion of the metal binder softer than the diamond particles wears in a short period of time and there is a problem that a cutting width stable for a long period of time cannot be obtained.

For polycrystalline diamond not containing a metal binder, a method of coating an inner surface of an orifice hole made of metal with a thin diamond film with a CVD (chemical vapor deposition) method is available. For such reasons as being a thin film or low bonding strength between diamond particles, however, wear tends to proceed and life is short.

In contrast, since nano polycrystalline diamond in the present embodiment is polycrystalline and excellent also in wear resistance, uneven wear as described above can effectively be suppressed. In addition, since nano polycrystalline diamond in the present embodiment contains no binder, progress of wear in a binder portion can also be avoided. Therefore, nano polycrystalline diamond in the present embodiment is useful also for an orifice for water jet.

As applications of a diamond material other than the above, an example of use of single-crystal diamond as a material for a wiredrawing die can be exemplified.

In single-crystal diamond, however, the problem of uneven wear as described above arises, and therefore, in a wiredrawing die including single-crystal diamond, there is a problem that an intended wire diameter and circularity cannot be obtained with lapse of time of use.

In the case of the wiredrawing die made of single-crystal diamond as well, as in the case of the orifice for water jet, an inner surface of a die hole has planes in various crystal orientations in a circumferential direction. Therefore, even though the inner surface of the die hole has an annular shape at the time when use was started, wear of a surface which is likely to wear proceeds in a short period of time, and the shape of the inner face of the die hole expands from the annular shape to a polygonal shape such as a hexagonal shape. Consequently, there is a problem that an intended wire diameter and circularity cannot be obtained.

As measures against uneven wear above, use of sintered diamond is also possible, however, as in the case of the orifice for water jet, a die hole expands and there is a problem that a wire diameter and circularity stable for a long period of time cannot be obtained.

Then, use of an acid for removal of a binder for use is considered. Since bonding strength among diamond particles is low, however, diamond particles fall off, and again there is a problem that an intended wire diameter and circularity cannot be obtained.

Use of polycrystalline diamond with the CVD method which is polycrystalline diamond containing no binder is also possible, however, there is a problem that bonding strength among diamond particles is again low, wear tends to proceed, and life is short. Similarly, it is also possible to use polycrystalline diamond containing no binder, which was obtained by direct conversion sintering with the use of indirect heating at an ultra-high pressure not lower than 8 GPa and an ultra-high temperature not lower than 2200° C., with high-purity graphite serving as a starting material. In this case, however, resistance to oxidation is poor, and hence there is a problem that wear tends to proceed and life is short.

In addition, in the case of fabrication of a wiredrawing die having a hole in a polygonal shape such as a quadrangular shape other than an annular shape, single-crystal diamond is worked with laser and highly precise working has been difficult. Though diamond containing a metal binder is conductive and capable of electric discharge machining, diamond has a large particle size, which similarly makes highly precise working difficult.

In contrast, since nano polycrystalline diamond in the present embodiment can effectively suppress uneven wear and contains no binder, even progress of wear in a binder portion can be avoided. In addition, since nano polycrystalline diamond in the present embodiment has great bonding strength among diamond particles, also has conductivity, and is excellent also in resistance to oxidation, it is useful also for a wiredrawing die.

Similarly, nano polycrystalline diamond in the present embodiment is useful also for such tools as a scribe tool, a scribing wheel, and a dresser.

Examples of another type of the present invention will now be described.

EXAMPLE 5

A methane gas and trimethylboron were mixed at 1:1 in the vacuum chamber, and the gas mixture above was blown onto a diamond base material heated to 1900° C. Here, a degree of vacuum within the vacuum chamber was set to 20 to 30 Torr. Then, graphite containing boron deposited on a substrate. Bulk density of this graphite was 2.0 g/cm$^3$. As a result of ICP element analysis, a concentration of boron in graphite was 0.06 mass %.

Graphite above was converted to diamond at a synthesis temperature of 2200° C. and at 15 GPa, to thereby obtain nano polycrystalline diamond to which boron was added. The polycrystalline diamond had a crystal grain size (a maximum length of a crystal grain) from 10 to 100 nm. No precipitation of $B_4C$ was observed in X-ray patterns. This nano polycrystalline diamond had Knoop hardness of 120 GPa. A substrate having a size of 3 mm×1 mm was cut from the nano polycrystalline diamond and electrical resistance of the substrate was measured, which was 100Ω.

EXAMPLE 6

A methane gas and trimethyl borate were mixed at 1:1 in the vacuum chamber, and the gas mixture above was blown onto a diamond base material heated to 1900° C. Here, a degree of vacuum within the vacuum chamber was set to 20 to 30 Torr. Then, graphite containing boron deposited on a substrate. Bulk density of this graphite was 2.0 g/cm$^3$. As a result of ICP element analysis, a concentration of boron in graphite was 0.5 mass %.

Graphite above was converted to diamond at a synthesis temperature of 2200° C. and at 15 GPa, to thereby obtain nano polycrystalline diamond to which boron was added. The polycrystalline diamond had a crystal grain size from 10 to 100 nm. No precipitation of $B_4C$ was observed in X-ray patterns. This nano polycrystalline diamond had Knoop hardness of 120 GPa. A substrate having a size of 3 mm×1 mm was cut from the nano polycrystalline diamond and electrical resistance of the substrate was measured, which was 10Ω.

EXAMPLE 7

A methane gas and trimethyl borate were mixed at 1:1 in the vacuum chamber, and the gas mixture above was blown onto a diamond base material heated to 1900° C. Here, a degree of vacuum within the vacuum chamber was set to 20 to 30 Torr. Then, graphite containing boron deposited on a substrate. Bulk density of this graphite was 2.0 g/cm$^3$. As a result of ICP element analysis, a concentration of boron in graphite was 0.5 mass %.

Graphite above was converted to diamond at a synthesis temperature of 2200° C. and at 8 GPa, to thereby obtain nano polycrystalline diamond to which boron was added. The polycrystalline diamond had a crystal grain size from 10 to 100 nm. No precipitation of $B_4C$ was observed in X-ray patterns. This nano polycrystalline diamond had Knoop hardness of 120 GPa. A substrate having a size of 3 mm×1 mm was cut from the nano polycrystalline diamond and electrical resistance of the substrate was measured, which was 10Ω.

EXAMPLE 8

A methane gas and trimethyl borate were mixed at 1:1 in the vacuum chamber, and the gas mixture above was blown onto a diamond base material heated to 1900° C. Here, a degree of vacuum within the vacuum chamber was set to 20 to 30 Torr. Then, graphite containing boron deposited on a substrate. Bulk density of this graphite was 2.0 g/cm$^3$. As a result of ICP element analysis, a concentration of boron in graphite was 0.5 mass %.

Graphite above was converted to diamond at a synthesis temperature of 1800° C. and at 15 GPa, to thereby obtain nano polycrystalline diamond to which boron was added. The polycrystalline diamond had a crystal grain size from 10 to 100 nm. No precipitation of $B_4C$ was observed in X-ray patterns. This nano polycrystalline diamond had Knoop hardness of 120 GPa. A substrate having a size of 3 mm×1 mm was cut from the nano polycrystalline diamond and electrical resistance of the substrate was measured, which was 10Ω.

COMPARATIVE EXAMPLE 2

Pure graphite having a particle size not greater than 2 μm and $B_4C$ were mixed, the mixture was fired at 2000° C., and a solid solution of carbon with boron was formed. A concentration of boron in graphite was 0.5 mass %. This graphite was directly converted to polycrystalline diamond at a synthesis temperature of 2200° C. at 15 GPa. The polycrystalline diamond, however, had a crystal grain size from 1 μm to 100 μm, and variation in crystal grain size was great. This polycrystalline diamond had Knoop hardness of 75 GPa. A substrate having a size of 3 mm×1 mm was cut from the polycrystalline diamond and electrical resistance of the substrate was measured, which was 10Ω.

COMPARATIVE EXAMPLE 3

Pure graphite having a particle size not greater than 2 μm was immersed for 12 hours in a solution containing boron and thereafter taken out, and graphite was subjected to heating treatment at 2000° C. A concentration of boron in graphite after heat treatment was 0.003 mass %. Whether a solution was alkaline, acid, or an organic solvent, substantially no boron was taken into graphite.

COMPARATIVE EXAMPLE 4

In the case that graphite having bulk density of 0.8 g/cm$^3$ was employed, volume change was great, and hence frequency of occurrence of such a situation that an apparatus should inevitably be stopped due to an abnormal condition during synthesis was at least twice.

COMPARATIVE EXAMPLE 5

When non-doped graphite of high purity was employed as a source material and it was held at a high pressure of 8 GPa at a high temperature of 2000° C., graphite did not convert to diamond.

EXAMPLE 9

Nano polycrystalline diamond in Examples above and non-doped nano polycrystalline diamond were used to fabricate scribe tools each having 4 points at a tip end (having a quadrangular two-dimensional shape), respectively. Each fabricated scribe tool was used to form 200 50 mm-long scribe grooves in a sapphire substrate at a load of 20 g. Thereafter, an amount of wear of the polycrystalline diamond at the tip end portion of each scribe tool was observed with an electron microscope. Then, the amount of wear of nano polycrystalline diamonds according to Examples above was 0.2 time or less, as compared with that of the scribe tool made of single-crystal diamond.

On the other hand, since non-doped nano polycrystalline diamond was poorer in characteristics of resistance to thermal oxidation than boron-added nano polycrystalline diamond in the present example, an amount of wear at the tip end of the scribe tool raised to a high temperature was 3 times as high as that in the present example. Thus, it could be confirmed that, by employing nano polycrystalline diamond in Examples above for scribe tools, nano polycrystalline diamond hardly wore, and hence change in tool shape was small and life more noticeable than that of non-doped nano polycrystalline diamond was exhibited.

EXAMPLE 10

Nano polycrystalline diamond in Examples above and non-doped nano polycrystalline diamond were used to fabricate a dresser having a single point at a tip end (having a conical shape). Each fabricated dresser was worn with a wet method by using a WA (white alumina) grindstone under such conditions as a peripheral speed of the grindstone of 30 m/sec. and a depth of cut of 0.05 mm. Thereafter, an amount of wear of the dresser was measured with a height gauge, and the amount of wear of nano polycrystalline diamonds according to Examples above was 0.3 time or less, as compared with that of the dresser made of single-crystal diamond.

On the other hand, since non-doped nano polycrystalline diamond was poorer in characteristics of resistance to thermal oxidation than boron-added nano polycrystalline diamond in the present example, an amount of wear at the tip end of the dresser raised to a high temperature was 4 times as high as that in the present example. Thus, it could be confirmed that, by employing nano polycrystalline diamond in Examples above for the dresser, nano polycrystalline diamond hardly wore, and hence change in tool shape was small, and life more noticeable than that of non-doped nano polycrystalline diamond was exhibited.

EXAMPLE 11

Nano polycrystalline diamond in Examples above and non-doped nano polycrystalline diamond were used to fabricate a drill (a rotating tool) having a diameter of φ 1 mm and a blade length of 3 mm. Each fabricated drill was used to drill a 1.0 mm-thick plate made of cemented carbide (WC—Co) under such conditions as revolutions of the drill of 4000 rpm and a feed of 2 μm/revolution. The number of holes that could be drilled until the drill was worn or broken was 5 times or more, as compared with that of the drill made of single-crystal diamond.

On the other hand, since non-doped nano polycrystalline diamond was poorer in characteristics of resistance to thermal oxidation than boron-added nano polycrystalline diamond in the present example, an amount of wear at the tip end of the drill raised to a high temperature was 4 times as high as that in the present example. Thus, it could be confirmed that, by employing nano polycrystalline diamond in Examples above for the drill, nano polycrystalline diamond hardly wore, hence change in tool shape was small, and life more noticeable than that of non-doped nano polycrystalline diamond was exhibited.

EXAMPLE 12

Boron-added nano polycrystalline diamond in which an added element was boron, a concentration thereof was $1\times10^{18}/cm^3$, and a crystal grain size thereof was 100 nm was employed as nano polycrystalline diamond used for a wiredrawing die. A wiredrawing die having a hole diameter of φ 30 μm was made of this nano polycrystalline diamond.

The wiredrawing die above was used to evaluate life of a die. Specifically, a wire drawing time period until a hole diameter of the die having a hole diameter of φ 30 μm expanded to φ 32 μm was counted, and the wire drawing time period was 5 times as long as the case of use of single-crystal diamond and twice as long as the case of use of non-doped nano polycrystalline diamond.

On the other hand, since non-doped nano polycrystalline diamond was poorer in characteristics of resistance to thermal oxidation than boron-added nano polycrystalline diamond in the present example, an amount of wear of a wire drawing friction surface raised to a high temperature was 5 times as much as that in the present example.

It could thus be confirmed that, by employing nano polycrystalline diamond in Examples above for a wiredrawing die, nano polycrystalline diamond hardly wore, hence change in tool shape was small, and life more noticeable than that of non-doped nano polycrystalline diamond was exhibited.

EXAMPLE 13

Boron-added nano polycrystalline diamond in which an added element was boron, a concentration thereof was $1\times10^{19}/cm^3$, and a crystal grain size thereof was 200 nm was employed as nano polycrystalline diamond used for an orifice for abrasive water jet. A polygonal orifice for water jet having a rectangular shape having a short side of 150 μm and a long side of 300 μm was made of this nano polycrystalline diamond.

Cutting performance was evaluated by using the orifice for water jet above. Specifically, a cutting time period until the long side of the orifice for water jet extended to 400 μm was counted, and the cutting time period was found to be 20 times as long as that of polycrystalline diamond containing Co as a metal binder and having a diamond particle size of 5 μm.

On the other hand, since non-doped nano polycrystalline diamond was poorer in characteristics of resistance to thermal oxidation than boron-added nano polycrystalline diamond in the present example, an amount of wear at a diamond surface of a hole in contact with abrasive particles (hard particles) raised to a high temperature was 3.5 times as high as that in the present example. It could thus be confirmed that, by employing nano polycrystalline diamond in Examples above for a nozzle, nano polycrystalline diamond hardly wore, hence change in tool shape was small, and life more noticeable than that of non-doped nano polycrystalline diamond was exhibited.

EXAMPLE 14

Graphite was deposited on a substrate with the technique the same as in Example 6. As a result of ICP element analysis, a concentration of boron was 0.5 mass %, which corresponded to a concentration of boron of $1\times10^{21}/cm^3$. By making use of this graphite, with the technique the same as in Example 6, nano polycrystalline diamond was directly obtained from graphite. A substrate having a size of 3 mm×1 mm was cut from this nano polycrystalline diamond and electrical resistance was measured, and an electrical resistance value was 10Ω.

The conductive nano polycrystalline diamond above was joined to a main body of a cutting tool with the use of an active brazing material in an inert atmosphere. After a surface of polycrystalline diamond was polished, a flank face was cut with electric discharge machining, to thereby fabricate an R cutting tool. For comparison, a tool made of sintered diamond containing a conventional Co binder (Comparative Example A) was similarly fabricated with electric discharge machining.

Accuracy of a ridge line of a cutting edge made through electric discharge machining was from 2 to 5 µm or smaller, depending on a particle size of contained diamond abrasive grains in Comparative Example A made of sintered diamond, whereas it was good, that is, not greater than 0.5 µm, in boron-added nano polycrystalline diamond (the present inventive example 1). In addition, a working time period was also equivalent to that in Comparative Example A.

In addition, a boron-added nano polycrystalline diamond tool (the present inventive example 2) of which flank face was worked with polishing, a non-doped nano polycrystalline diamond tool (Comparative Example B), and a single-crystal diamond tool (Comparative Example C) were fabricated and cutting evaluation was made. In both of the present inventive example 2 and Comparative Example B, accuracy of a ridge line of a cutting edge was not greater than 0.1 µm and minute accuracy of a cutting edge was obtained.

It is noted that contents in evaluation tests are as follows.
Tool shape: Corner R of 0.4 mm, a relief angle of 11°, and a rake angle of 0°
Work material: Material—aluminum alloy A390
 Shape—φ110×500 mm with 4 U-shaped grooves
Working method: Interrupted turning of an outer circumference of a cylinder wet method
Cutting fluid: Water-soluble emulsion
Cutting condition: Cutting speed Vc=800 m/min., depth of cut ap=0.2 mm, feed rate f=0.1 mm/rev., cutting distance of 10 km After cutting evaluation was made under the conditions above, the cutting edge of the tool was observed and a state of wear and tear was checked. Then, in Comparative Example A, an amount of wear of a flank face was as great as approximately 45 µm and a shape of the cutting edge was lost, whereas in the case of the present inventive example 1, an amount of wear of a flank face was 5 µm, which was satisfactory.

On the other hand, in the present inventive example 2 in which finishing with polishing was performed, an amount of wear was approximately 2 µm, and it was much better than an amount of wear of 3.5 µm in Comparative Example B and an amount of wear of 3.5 µm in Comparative Example C. It was found that the present inventive example 2 exhibited wear resistance characteristics equal to or higher than those of conventional non-doped nano polycrystalline diamond and it was excellent in tool life.

Characteristics were compared between the case of use of non-doped nano polycrystalline diamond and the case of use of boron-added nano polycrystalline diamond. Then, non-doped nano polycrystalline diamond burnt owing to oxygen in atmosphere at a high temperature not lower than 600° C. and a mass thereof gradually decreased. Then, at 950° C., deformation of the cutting tool was significant, and 80% of nano polycrystalline diamond was lost by burning.

In contrast, in nano polycrystalline diamond in Examples above, substantially no decrease in mass was observed even between 600° C. and 800° C., and even at a temperature of 950° C. or higher, loss of the mass was only 5 to 8%.

It could thus be confirmed that, in the case of use of nano polycrystalline diamond in Examples above for a cutting tool as well, nano polycrystalline diamond had excellent wear resistance, it was not burnt and lost even at a high temperature, hence change in a tool shape was small, and it exhibited resistance to oxidation more noticeable than that of non-doped nano polycrystalline diamond.

EXAMPLE 15

For synthesis of source materials for nano polycrystalline diamond, initially, a methane gas and trimethylboron were mixed at 4:1 in the vacuum chamber, and the mixture above was blown onto a diamond substrate heated to 1900° C. to deposit graphite on the substrate. Here, a degree of vacuum within the chamber was set to 20 to 30 Torr. Bulk density of the obtained graphite was 2.0 g/cm³. As a result of SIMS element analysis, a concentration of boron was approximately 50 ppm, which corresponded to a concentration of boron of $1\times10^{19}/cm^3$.

Graphite above was made use of to thereby obtain nano polycrystalline diamond directly from graphite at a synthesis temperature of 2200° C. and at 15 GPa. The nano polycrystalline diamond had a crystal grain size from 10 to 100 nm. No precipitation of $B_4C$ or the like was observed in X-ray patterns. This polycrystalline diamond had Knoop hardness of 125 GPa. A substrate having a size of 3 mm×1 mm was cut from this nano polycrystalline diamond and electrical resistance was measured, and an electrical resistance value was 500Ω.

The conductive nano polycrystalline diamond above was joined to a main body of a cutting tool with the use of an active brazing material in an inert atmosphere, and a surface of polycrystalline diamond was polished. In addition, a boron-added polycrystalline diamond tool (the present inventive example 3) of which flank face was worked with polishing, a non-doped nano polycrystalline diamond tool (Comparative Example D), and a single-crystal diamond tool (Comparative Example E) were fabricated and cutting evaluation was made. In both of the present inventive example 3 and Comparative Example D, accuracy of a ridge line of a cutting edge was not greater than 0.1 µm and minute accuracy of a cutting edge was obtained.

It is noted that contents in evaluation tests are as follows.
Tool shape: Corner R of 0.4 mm, a relief angle of 11°, and a rake angle of 0°
Work material: Material—aluminum alloy A390
Shape—φ 110×500 mm with 4 U-shaped grooves
Working method: Interrupted turning of an outer circumference of a cylinder wet method
Cutting fluid: Water-soluble emulsion
Cutting condition: Cutting speed Vc=800 m/min., depth of cut ap=0.2 mm, feed rate f=0.1 mm/rev., cutting distance of 10 km In the present inventive example 3, an amount of wear was approximately 1.0 μm, and it was much better than an amount of wear of 3.5 μm in Comparative Example D and an amount of wear of 3.5 μm in Comparative Example E. It was found that the present inventive example 3 exhibited wear resistance characteristics equal to or higher than those of conventional non-doped nano polycrystalline diamond and it was excellent in tool life.

A temperature at a cutting point of a cutting edge of a tool during cutting is extremely high. Since boron-added nano polycrystalline diamond better in resistance to oxidation than non-doped nano polycrystalline diamond was extremely unsusceptible to thermal degradation due to friction heat during cutting or reaction wear at a high temperature, it can obtain performance higher than non-doped nano polycrystalline diamond or single-crystal diamond.

It could thus be confirmed that, in the case of use of nano polycrystalline diamond in Examples above for a cutting tool as well, nano polycrystalline diamond had excellent wear resistance, hence change in a tool shape was small, and it exhibited performance more noticeable than non-doped nano polycrystalline diamond.

EXAMPLE 16

Graphite was deposited on the substrate with the technique the same as in Example 6. As a result of ICP element analysis, a concentration of boron was 0.5 mass %, which corresponded to a concentration of boron of $1\times10^{21}/cm^3$. By making use of this graphite, with the technique the same as in Example 6, nano polycrystalline diamond was directly obtained from graphite. A substrate having a size of 3 mm×1 mm was cut from this nano polycrystalline diamond and electrical resistance was measured, and an electrical resistance value was 10Ω.

The conductive nano polycrystalline diamond above was joined to a main body of a cutting tool with the use of an active brazing material in an inert atmosphere. After a surface of polycrystalline diamond was polished, a flank face was cut with electric discharge machining, to thereby fabricate a ball end mill (the present inventive example 4) of φ 0.5 mm, having two twisted cutting blades. For comparison, a tool made of sintered diamond containing a conventional Co binder (Comparative Example F) was similarly fabricated through electric discharge machining.

Accuracy of a ridge line of a cutting edge made through electric discharge machining was approximately from 2 to 5 μm, depending on a particle size of contained diamond abrasive grains in Comparative Example F made of sintered diamond, whereas it was not greater than 0.5 μm in boron-added nano polycrystalline diamond (the present inventive example 4), which was satisfactory. In addition, non-doped nano polycrystalline diamond was used to fabricate an end mill having the same shape with laser machining, and a flank face was locally polished to finish a cutting edge grade (Comparative Example G).

It is noted that contents in evaluation tests are as follows.
Tool shape: φ 0.5 mm double-bladed ball end mill
Work material: Material—STAVAX
Cutting fluid: Kerosene
Cutting condition: Tool revolution speed of 20000 rpm, depth of cut ap=0.005 mm/pitch, feed rate f=100 mm/min.

Cutting evaluation was made under the conditions above, and then tool life in the present inventive example 4 was at least 5 times as long as that in Comparative Example F and at least 1.5 time as long as that in Comparative Example G, which was very good. A temperature at a cutting point of a cutting edge of a tool during cutting was extremely high. Since boron-added nano polycrystalline diamond better in resistance to oxidation than non-doped nano polycrystalline diamond was extremely unsusceptible to thermal degradation due to friction heat during cutting or reaction wear, it can obtain higher performance than non-doped nano polycrystalline diamond or single-crystal diamond also in cutting of a high-hardness mold material.

It could thus be confirmed that, in the case of use of nano polycrystalline diamond in Examples above for a rotating tool as well, nano polycrystalline diamond had excellent wear resistance, hence change in a tool shape was small, and it exhibited performance more noticeable than that of non-doped nano polycrystalline diamond.

EXAMPLE 17

Graphite was deposited on the substrate with the technique the same as in Example 6. As a result of ICP element analysis, a concentration of boron was 0.5 mass %, which corresponded to a concentration of boron of $1\times10^{21}/cm^3$. By making use of this graphite, with the technique the same as in Example 6, nano polycrystalline diamond was directly obtained from graphite. A substrate having a size of 3 mm×1 mm was cut from this nano polycrystalline diamond and electrical resistance was measured, and an electrical resistance value was 10Ω. A scribing wheel having a diameter of 3 mm, a thickness of 0.8 mm, and a cutting angle of 120° was fabricated from the obtained polycrystalline body through electric discharge machining, and scribing of a glass substrate was evaluated. Consequently, the diamond polycrystalline body in the present example could scribe a long distance of approximately 250 km.

For comparison, scribing wheels of the same shape were created with non-doped polycrystalline diamond and single-crystal diamond, and scribing of a glass substrate was similarly evaluated. Then, non-doped polycrystalline diamond could scribe 240 km which was substantially equivalent to the diamond polycrystalline body in the present example, whereas single-crystal diamond could scribe only a distance of ⅓ thereof.

On the other hand, since non-doped nano polycrystalline diamond was poorer in characteristics of resistance to thermal oxidation than boron-added nano polycrystalline diamond in the present example, an amount of wear of an outer circumference of the scribing wheel raised to a high temperature was 1.5 time as high as that of the present example. It could thus be confirmed that, with the use of nano polycrystalline diamond in Examples above for a scribing wheel, nano polycrystalline diamond hardly wore, hence change in a tool shape was small, and life more noticeable than non-doped nano polycrystalline diamond was exhibited.

In addition, it could also be confirmed that excellent tool life, wear resistance, resistance to oxidation, and the like are exhibited by applying nano polycrystalline diamond in the present example to various tools.

It is considered, however, that nano polycrystalline diamond having excellent characteristics could be fabricated within the scope described in Scope of Claims for patent even though conditions are out of the range above.

An embodiment of yet another type of the present invention will be described hereinafter with reference to FIG. 4.

Group-V-element-added nano polycrystalline diamond in the present embodiment contains a group V element added to be dispersed at the atomic level in carbon forming a polycrystalline diamond body.

A group V element is an element which can have a bond greater by 1 in the number of electrons than carbon and it is an element serving as a donor in diamond. For example, phosphorus, nitrogen, arsenic, antimony, bismuth, and the like can be exemplified as group V elements. Though one or more elements selected from theses elements can be employed, other elements having a similar function may be employed. Among the group V elements, phosphorus is suitable, however, phosphorus alone may be used or mixed elements which are combination of phosphorus and another element can also be employed.

Figure 4:
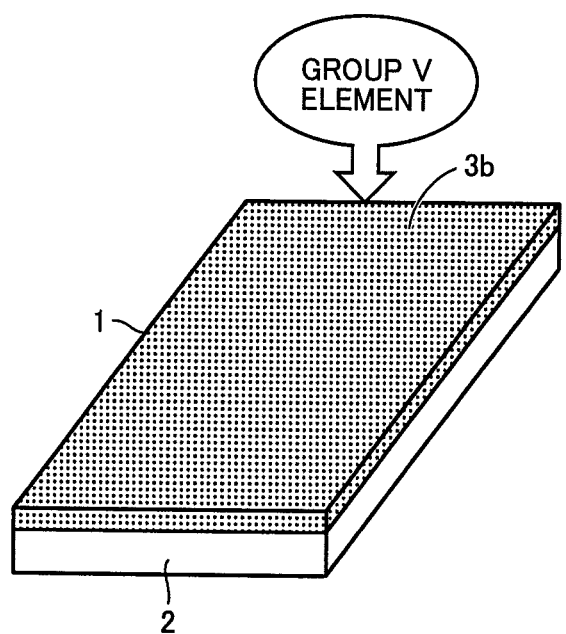
FIG. 4 is a perspective view showing a state that polycrystalline diamond in yet another embodiment of the present invention is fabricated on a base material.

As shown in FIG. 4, nano polycrystalline diamond 1 in the present embodiment is formed on base material 2 and contains a group V element 3 $b$ uniformly dispersed at the atomic level. It is noted that the "group V element dispersed at the atomic level" herein refers, for example, to a dispersed state at such a level that, when carbon and a group V element are mixed in a vapor phase state and solidified to thereby fabricate solid carbon in a vacuum atmosphere, the group V element is dispersed in solid carbon.

Nano polycrystalline diamond 1 can be fabricated by subjecting graphite formed on the base material to heat treatment. Graphite is an integral solid and contains a crystallized portion. Though nano polycrystalline diamond 1 has a flat-plate shape in the example in FIG. 4, it is possible to have any shape and thickness. In the case that nano polycrystalline diamond 1 is fabricated by subjecting graphite formed on the base material to heat treatment, nano polycrystalline diamond 1 and graphite basically have the same shape.

The group V element above can be added to graphite in the stage of formation of graphite. Specifically, graphite can be formed on the base material by thermally decomposing a gas mixture of a gas containing a group V element and a hydrocarbon gas at a temperature not lower than 1500° C. so that at the same time, the group V element can be added to graphite.

As the gas containing a group V element, for example, a gas composed of a hydride of a group V element can be employed. In addition, a gas of an organic metal base which contains a group V element can also be employed. In the case that phosphorus is added to graphite, a gas of one or more selected from trimethylphosphorus, triethylphosphorus, trimethylphosphine, triphenylphosphine, and tertiary butyl phosphine can be employed. In the case that nitrogen is added to graphite, a gas of one or more selected from trimethyl hydrazine and ammonia can be employed. In the case that arsenic is added to graphite, a gas of one or more selected from trimethylarsenic, triethylarsenic, and tertiary butyl arsine can be employed. In the case that antimony is added to graphite, a gas of one or more selected from trimethylantimony, triethylantimony, and tertiary butyl antimony can be employed. In the case that bismuth is added to graphite, a gas of one or more selected from trimethylbismuth, triethylbismuth, and tertiary butyl bismuth can be employed. It is also possible that two or more of the gases above are mixed as appropriate.

As described above, by mixing a group V element in a source material gas for formation of graphite in a vapor phase state to thereby add the group V element to graphite, the group V element can uniformly be added to graphite at the atomic level. In addition, by appropriately adjusting an amount of addition of a gas containing the group V element to the hydrocarbon gas, a desired amount of group V element can be added to graphite.

The gas mixture above can thermally be decomposed in a vacuum chamber, and by setting a degree of vacuum within the vacuum chamber to be relatively be high here, introduction of an impurity into graphite can be suppressed. Actually, however, an unintended inevitable impurity is introduced in graphite. An element such as hydrogen, oxygen, boron, silicon, and a transition metal, other than the group V element above, can be exemplified as this inevitable impurity.

In graphite used for fabricating group-V-element-added nano polycrystalline diamond in the present embodiment, an amount of each inevitable impurity is approximately 0.01 mass % or lower. Namely, a concentration of an inevitable impurity in graphite is approximately not higher than the detection limit in SIMS (Secondary Ion Mass Spectrometry) analysis. In addition, a concentration of a transition metal in graphite is approximately not higher than the detection limit in ICP (Inductively Coupled Plasma) analysis or SIMS analysis.

Thus, in the case that an amount of an impurity in graphite is lowered down to a level of the detection limit in SIMS analysis or ICP analysis and diamond is fabricated with graphite, polycrystalline diamond extremely small in an amount of impurity other than a group V element of which addition has been intended can be fabricated. It is noted that, even when graphite containing an impurity slightly more than the detection limit in SIMS analysis or ICP analysis is employed, polycrystalline diamond having characteristics significantly better than the conventional example is obtained.

Nano polycrystalline diamond in the present embodiment uniformly contains a group V element at the atomic level as above, while an amount of an impurity is extremely small. In this nano polycrystalline diamond, atoms of the group V element do not aggregate as clusters in carbon but they are substantially uniformly dispersed over the entire diamond. Ideally, atoms of the group V element are present as isolated from one another in carbon. Atoms of the group V element are present in carbon (the diamond body) in a state substituted for carbon atoms, and they are not simply introduced in carbon but in such a state that atoms of the group V element and carbon atoms are chemically bonded to each other.

As described above, since nano polycrystalline diamond in the present embodiment contains the group V element dispersed in carbon at the atomic level, nano polycrystalline diamond to which the group V element has uniformly been added at an unprecedented level is obtained. In addition, since the group V element can uniformly be dispersed in nano polycrystalline diamond at the atomic level, desired n-type conductivity can be provided to the entire diamond. Consequently, excellent electron emission characteristics can be provided to diamond.

Here, electron emission characteristics of the group-V-element-added nano polycrystalline diamond in the present embodiment were confirmed and hence results thereof will be described.

A needle-shaped electron gun (an electron emission source) having a shape which can be accommodated in a virtual column having a diameter of 6 μm and a height of 25 μm was fabricated and electron emission characteristics thereof were examined. Then, it was found that this electron gun could steadily extract an emission current of 150 μA by an extraction voltage of 5 kV and it could be used as a high-performance electron source.

In addition, it was also found that this electron gun was composed of nano polycrystalline diamond, and hence it had no anisotropy and it was excellent in durability. In an electron gun made of normal single-crystal diamond or a diamond polycrystalline body of a size of the micron order, a needle is broken when discharge takes place even once. It was found, however, that the electron gun made of nano polycrystalline diamond in the present embodiment was advantageous as an electron emission source made of nano polycrystalline diamond in that it did not break even after discharge 5 to 10 times and change in characteristics after discharge was also less. Specifically, it could be confirmed that an emission current was around 150 μA±10 μA by an extraction voltage of 5 kV and change in emission current was very small.

From the foregoing, by employing group-V-element-added nano polycrystalline diamond in the present embodiment for an electron gun, high-performance and stable electron emission characteristics can be realized while durability of the electron gun is improved.

In nano polycrystalline diamond in the present embodiment to which a group V element has been added, the group V element is dispersed in diamond at the atomic level, and therefore there is substantially no group V element introduced in diamond as aggregated as described above. In addition, the added group V element does not aggregate at a crystal grain boundary of diamond and there is very little impurity in diamond. Therefore, abnormal growth of a diamond crystal can also effectively be suppressed. Consequently, nano polycrystalline diamond having a crystal grain size (a maximum length of a crystal grain) of a nano size such as from 10 to 500 nm and having n-type conductivity is obtained.

In addition, in nano polycrystalline diamond in the present embodiment, concentration distribution of the group V element in diamond is also less likely. From this fact as well, local abnormal growth of crystal grains of diamond can effectively be suppressed. Consequently, as compared with a conventional example, sizes of the crystal grains of diamond can also be the same.

A concentration of a group V element in diamond can arbitrarily be set. A high or low concentration of a group V element in diamond can be set. In any case, since a group V element can uniformly be dispersed in diamond, generation of concentration distribution of the group V element in diamond can effectively be suppressed. Thus, occurrence of local variation of conductivity in diamond can also effectively be suppressed.

It is noted that a concentration of an added group V element is preferably within a range from $10^{14}$ to $10^{22}$/cm$^3$, in order to provide n-type conductivity to diamond. In order to provide good conductivity like a metal to diamond, a concentration of an added group V element is preferably not lower than approximately $10^{19}$/cm$^3$, and in order to provide a property as a semiconductor to diamond, a concentration of an added group V element is approximately from $10^{14}$ to less than $10^{19}$/cm$^3$.

A method for manufacturing group-V-element-added nano polycrystalline diamond in the present embodiment will now be described.

Initially, in a vacuum chamber, a base material is heated to a temperature approximately not lower than 1500° C. and not higher than 3000° C. A well known technique can be adopted as a heating method. For example, it is possible that a heater capable of directly or indirectly heating the base material to a temperature not lower than 1500° C. can be provided in the vacuum chamber.

Any metal, inorganic ceramic material, or carbon material can be used as the base material, so long as it is a material capable of withstanding a temperature approximately from 1500° C. to 3000° C. From a point of view of not introducing an impurity in graphite serving as a source material, however, the base material is preferably made of carbon. More preferably, it is possible that the base material is composed of diamond or graphite containing very little impurity. In this case, at least a surface of the base material should only be composed of diamond or graphite.

Then, a hydrocarbon gas and a gas containing a group V element are introduced in the vacuum chamber. Here, a degree of vacuum within the vacuum chamber is set approximately to 20 to 100 Torr. Thus, the hydrocarbon gas and the gas containing the group V element can be mixed within the vacuum chamber. By thermally decomposing this gas mixture at a temperature not lower than 1500° C., graphite in which the group V element has been taken at the atomic level can be formed on the base material. It is noted that the base material may be heated after introduction of the gas mixture and then graphite containing the group V element may be formed on the base material.

For example, a methane gas can be used as the hydrocarbon gas. Various gases described above can be employed as the gas containing the group V element. The gas mixture of the hydrocarbon gas and the gas containing the group V element can be introduced in the vacuum chamber at a ratio, for example, from $10^{-7}$% to 100%.

In forming graphite, the hydrocarbon gas and the gas containing the group V element are preferably fed toward the surface of the base material. Thus, the gases can be mixed efficiently in the vicinity of the base material, so that graphite containing the group V element can efficiently be generated on the base material. The hydrocarbon gas and the group-V-element-containing gas may be supplied from directly above the base material toward the base material, or may be supplied toward the base material in an oblique direction or in a horizontal direction. It is also possible that a guide member for guiding the hydrocarbon gas and the group-V-element-containing gas to the base material is provided in the vacuum chamber.

Graphite that a group V element has been added to be dispersed in carbon at the atomic level, which is manufactured as described above and has a crystal grain size not greater than 10 μm, is sintered in the vacuum chamber, so that group-V-element-added nano polycrystalline diamond to which the group V element has uniformly been added at an unprecedented level can be fabricated.

When graphite is thus directly converted to nano polycrystalline diamond, a crystal grain size of graphite is reflected on a crystal grain size of nano polycrystalline diamond. Then, a crystal grain size in a crystallized portion of graphite is preferably not greater than 10 μm as described above, such that a crystal grain size of the resultant diamond is of the nanometer order. Thus, after sintering of graphite, nano polycrystalline diamond having crystal grains of a nano size is obtained. For example, polycrystalline diamond can have a crystal grain size approximately from 10 to 500 nm.

It is noted that, in the step of converting graphite to diamond, graphite is preferably subjected to heat treatment within high-temperature and high-pressure press equipment without adding a sintering aid or a catalyst. In addition, in the step of converting graphite to diamond, graphite formed on the base material may be subjected to heat treatment within high-temperature and high-pressure press equipment.

Graphite which can be used for fabrication of nano polycrystalline diamond in the present embodiment is, for example, crystalline graphite partially containing a crystallized portion or polycrystalline. Density of graphite is preferably higher than 0.8 g/cm$^3$. Thus, volume change during sintering of graphite can be made smaller. From a point of view of making volume change during sintering of graphite smaller and improving yield, experimentally, density of graphite is further preferably approximately not lower than 1.4 g/cm$^3$ and not higher than 2.0 g/cm$^3$.

The reason why density of graphite is within the range above is because it is considered that, when density of graphite is lower than 1.4 g/cm$^3$, volume change during a high-temperature and high-pressure process is too large and temperature control may become impossible. In addition, it is because, when density of graphite is higher than 2.0 g/cm$^3$, probability of occurrence of crack in diamond may be twice or higher.

Examples of yet another type of the present invention will now be described.

EXAMPLE 18

A methane gas and trimethylphosphorus were mixed at 1:1 in the vacuum chamber, and the gas mixture above was blown onto a diamond base material heated to 1900° C. Here, a degree of vacuum within the vacuum chamber was set to 20 to 30 Torr. Then, graphite containing phosphorus deposited on a substrate. Bulk density of this graphite was 2.0 g/cm$^3$. In addition, according to observation with an SEM (Scanning Electron Microscope), graphite had a crystal grain size (a maximum length of a crystal grain) approximately from 100 nm to 10 μm. As a result of ICP element analysis, a concentration of phosphorus in graphite was 0.06%.

Graphite above was converted to diamond at a synthesis temperature of 2200° C. and at 15 GPa in high-temperature and high-pressure press equipment, to thereby obtain nano polycrystalline diamond to which phosphorus was added. The polycrystalline diamond had a crystal grain size from 10 to 100 nm. No precipitation of single-phase phosphorus was observed in X-ray patterns. This nano polycrystalline diamond had Knoop hardness of 120 GPa. A substrate having a size of 3 mm×1 mm was cut from the nano polycrystalline diamond and electrical resistance of the substrate was measured, which was 1 kΩ.

EXAMPLE 19

A methane gas and trimethyl phosphate were mixed at 1:1 in the vacuum chamber, and the gas mixture above was blown onto a diamond base material heated to 1900° C. Here, a degree of vacuum within the vacuum chamber was set to 20 to 30 Torr. Then, graphite containing phosphorus deposited on a substrate. Bulk density of this graphite was 2.0 g/cm$^3$. In addition, according to observation with an SEM (Scanning Electron Microscope), graphite had a crystal grain size approximately from 100 nm to 10 μm. As a result of ICP element analysis, a concentration of phosphorus in graphite was 0.5%.

Graphite above was converted to diamond at a synthesis temperature of 2200° C. and at 15 GPa in high-temperature and high-pressure press equipment, to thereby obtain nano polycrystalline diamond to which phosphorus was added. The polycrystalline diamond had a crystal grain size from 10 to 100 nm. No precipitation of single-phase phosphorus was observed in X-ray patterns. This nano polycrystalline diamond had Knoop hardness of 120 GPa. A substrate having a size of 3 mm×1 mm was cut from the nano polycrystalline diamond and electrical resistance of the substrate was measured, which was 10Ω.

EXAMPLE 20

Electron emission characteristics of the nano polycrystalline diamond in Example 19 were examined with the following technique. A needle-shaped electron gun (an electron emission source) having a shape which can be accommodated in a virtual column having a diameter of 6 μm and a height of 25 μm was fabricated. This electron gun can steadily extract an emission current of 150 μA by an extraction voltage of 5 kV. In addition, this electron gun did not break even after discharge 5 to 10 times, and change in electron emission characteristics after discharge was also very small, that is, around 150 μA±10 μA at an extraction voltage of 5 kV, and the characteristics were stable.

COMPARATIVE EXAMPLE 6

Pure graphite having a particle size not greater than 2 μm and red phosphorus were mixed and the mixture was fired at 2000° C., to thereby form a solid solution of carbon with phosphorus. A concentration of phosphorus in graphite was 0.5%. This graphite was directly converted to polycrystalline diamond at a synthesis temperature of 2200° C. and at 15 GPa. In diamond polycrystal, however, an opaque portion and a transparent portion were present, and presence thereof could clearly be recognized even with naked eyes. Polycrystalline diamond had a crystal grain size from 100 μm to 500 μm and variation in crystal grain size was great. With regard to Knoop hardness of this polycrystalline diamond, the transparent portion (a portion not doped with phosphorus) had Knoop hardness of 100 GPa and the opaque portion (a portion doped with phosphorus) had Knoop hardness of 60 GPa. In addition, polycrystalline diamond had electrical resistance of 800 kΩ.

COMPARATIVE EXAMPLE 7

Pure graphite having a particle size not greater than 2 μm was immersed for 12 hours in a solution containing phosphorus and thereafter taken out, and graphite was subjected to heating treatment at 2000° C. A concentration of phosphorus in graphite after heat treatment was 0.001% or lower. Whether a solution was alkaline, acid, or an organic solvent, substantially no phosphorus was taken into graphite.

COMPARATIVE EXAMPLE 8

In the case that graphite having bulk density of 0.8 g/cm$^3$ was employed, frequency of occurrence of such a situation that volume change was great, and hence an abnormal condition during synthesis, that is, deformation of a heater material, was significant, partial or total break of wire occurred, a set value for a current • a voltage could no longer be held, and an apparatus should inevitably be stopped was at least twice.

In Examples above, it could be confirmed that, by setting a degree of vacuum within a vacuum chamber to 20 to 30 Torr, mixing a hydrocarbon gas and a gas containing phosphorus within the vacuum chamber, and supplying the gas mixture onto a base material heated to a temperature around 1900° C., graphite which had a solid phase and a bulk density around 2.0 g/cm³ and in which phosphorus was dispersed at the atomic level could be fabricated on the base material. In addition, it could also be confirmed that, by converting graphite to diamond at a synthesis temperature of 2200° C. and at 15 GPa, nano polycrystalline diamond in which phosphorus was dispersed at the atomic level and of which crystal grain size (a maximum length of a crystal grain) was approximately from 10 to 100 nm could be fabricated. It is considered, however, that nano polycrystalline diamond having excellent characteristics could be fabricated within the scope described in Scope of Claims for patent even though conditions are out of the range above.

Though the embodiments and the examples of the present invention have been described above, the embodiments and the examples described above can also variously be modified. In addition, the scope of the present invention is not limited to the embodiments and the examples described above. The scope of the present invention is defined by the terms of the claims and is intended to include any modifications within the scope and meaning equivalent to the terms of the claims.

The invention claimed is:

1. Polycrystalline diamond, comprising:
    carbon;
    a group V element added to be dispersed in said carbon at an atomic level; and
    one or more inevitable impurities,
    the polycrystalline diamond having a crystal grain size not greater than 500 nm,
    wherein said polycrystalline diamond is fabricated by sintering graphite obtained by thermally decomposing a gas mixture of a gas containing said group V element and a hydrocarbon gas at a temperature not lower than 1500° C., and
    wherein an amount of each inevitable impurity is approximately 0.01 mass % or lower in said graphite.

2. The polycrystalline diamond according to claim 1, wherein
    said group V element is dispersed in said carbon as a substitutional isolated atom.

3. The polycrystalline diamond according to claim 1, wherein
    a concentration of said group V element is not lower than $1 \times 10^{14}/cm^3$ and not higher than $1 \times 10^{22}/cm^3$.

* * * * *